(12) United States Patent
Han et al.

(10) Patent No.: US 10,455,629 B2
(45) Date of Patent: Oct. 22, 2019

(54) GATEWAY, NETWORK ASSIGNMENT METHOD OF GATEWAY, MME, NETWORK ASSIGNMENT METHOD OF MME, TERMINAL, AND NETWORK CONNECTION METHOD OF TERMINAL IN WIRELESS COMMUNICATION SYSTEM

(71) Applicant: Samsung Electronics Co., Ltd., Gyeonggi-do (KR)

(72) Inventors: Kyuho Han, Gyeonggi-do (KR); Seongryong Kang, Gyeonggi-do (KR); Daejoong Kim, Gyeonggi-do (KR); Sangheon Lee, Seoul (KR); Jaehyun Hwang, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 39 days.

(21) Appl. No.: 15/720,700

(22) Filed: Sep. 29, 2017

(65) Prior Publication Data
US 2018/0092142 A1 Mar. 29, 2018

Related U.S. Application Data

(60) Provisional application No. 62/401,595, filed on Sep. 29, 2016.

(30) Foreign Application Priority Data

Nov. 28, 2016 (KR) ........................ 10-2016-0159371

(51) Int. Cl.
*H04W 16/14* (2009.01)
*H04W 36/00* (2009.01)
(Continued)

(52) U.S. Cl.
CPC .......... *H04W 76/12* (2018.02); *H04W 16/14* (2013.01); *H04W 36/0033* (2013.01);
(Continued)

(58) Field of Classification Search
CPC ..... H04W 76/15; H04W 88/16; H04W 16/14; H04W 36/0033; H04W 36/14;
(Continued)

(56) References Cited

U.S. PATENT DOCUMENTS 9,681,481 B2 * 6/2017 Liu ........................ H04W 76/15
2011/0028322 A1 2/2011 Sekino et al.
(Continued)

OTHER PUBLICATIONS

Deutsche Telekom AG, "5G Architecture Options-Full Set", RP-161266, 3GPP Joint RAN/SA Meeting Jun. 14, 2016, pp. 1-11.

*Primary Examiner* — Ahmed Elallam
(74) *Attorney, Agent, or Firm* — The Farrell Law Firm, P.C.

(57) ABSTRACT

A network assignment method of a gateway in a wireless communication system including a first communication network and a second communication network is provided. The method includes receiving, when a terminal is connected to the first communication network, a create session request message from a second mobility management entity associated with a second base station operating the second communication network, allocating second attach information for establishing a bearer between the gateway and the second base station based on first attach information generated for connection to the first communication network, and transmitting a create session response message including the second attach information to the second mobility management entity in response to the create session request message.

20 Claims, 18 Drawing Sheets

(51) Int. Cl.
*H04W 36/38* (2009.01)
*H04W 88/16* (2009.01)
*H04W 76/12* (2018.01)
*H04W 76/16* (2018.01)
*H04B 7/0413* (2017.01)
*H04W 48/20* (2009.01)
*H04W 8/08* (2009.01)
*H04W 36/14* (2009.01)
*H04W 36/28* (2009.01)

(52) U.S. Cl.
CPC ........... *H04W 36/38* (2013.01); *H04W 76/16* (2018.02); *H04B 7/0413* (2013.01); *H04W 8/082* (2013.01); *H04W 36/14* (2013.01); *H04W 36/28* (2013.01); *H04W 48/20* (2013.01); *H04W 88/16* (2013.01)

(58) Field of Classification Search
CPC ..... H04W 36/28; H04W 36/38; H04W 48/20; H04W 76/12; H04W 76/16; H04W 8/082; H04B 7/0413
See application file for complete search history.

(56) References Cited

U.S. PATENT DOCUMENTS

| | | | | |
|---|---|---|---|---|
| 2017/0311278 A1* | 10/2017 | Adjakple | .............. | H04W 60/00 |
| 2017/0311290 A1* | 10/2017 | Adjakple | .............. | H04W 76/18 |
| 2017/0347251 A1* | 11/2017 | Kim | ....................... | H04W 76/12 |
| 2018/0092085 A1* | 3/2018 | Shaheen | ................ | H04W 28/08 |
| 2018/0139762 A1* | 5/2018 | Cho | ......................... | H04W 4/90 |
| 2018/0220478 A1* | 8/2018 | Zhu | ......................... | H04W 4/70 |
| 2018/0220479 A1* | 8/2018 | Shu | ......................... | H04W 88/16 |
| 2018/0242395 A1* | 8/2018 | Selvaganapathy | .... | H04W 88/16 |
| 2018/0288233 A1* | 10/2018 | Tamura | ................. | H04W 76/15 |
| 2018/0288657 A1* | 10/2018 | Stojanovski | ...... | H04W 36/0055 |
| 2018/0302857 A1* | 10/2018 | Shan | ...................... | H04W 76/22 |
| 2018/0324632 A1* | 11/2018 | Cho | ......................... | H04W 28/02 |
| 2018/0359802 A1* | 12/2018 | Cho | ......................... | H04W 76/22 |
| 2019/0053306 A1* | 2/2019 | Cho | ......................... | H04W 8/08 |
| 2019/0159273 A1* | 5/2019 | Shi | ........................ | H04W 76/12 |
| 2019/0223131 A1* | 7/2019 | Zhang | ................. | H04W 60/005 |

* cited by examiner

IWK Connection management (GW-C)

(a)

(b)

(c)

GATEWAY, NETWORK ASSIGNMENT METHOD OF GATEWAY, MME, NETWORK ASSIGNMENT METHOD OF MME, TERMINAL, AND NETWORK CONNECTION METHOD OF TERMINAL IN WIRELESS COMMUNICATION SYSTEM

PRIORITY

The present application claims priority to U.S. Provisional Application Ser. No. 62/401,595, which was filed on Sep. 29, 2016, and Korean Patent Application Serial No. 10-2016-0159371, which was filed in the Korean Intellectual Property Office on Nov. 28, 2016, the entire content of each of these applications being incorporated herein by reference.

BACKGROUND

The present disclosure relates, generally, to a method of communicating between electronic devices, and more particularly, to a network assignment procedure of a mobility management entity (MME), a gateway, and a user equipment (UE), for communicating between heterogeneous networks in a wireless communication system.

In order to meet the increasing demand for wireless data traffic, i.e., since the commercialization of $4^{th}$ generation (4G) communication systems, $5^{th}$ generation (5G) or pre-5G communication systems are currently being developed; the 5G or pre-5G communication systems are sometimes referred to as a beyond 4G network communication system or post long-term evolution (LTE) system.

The international communication organizations including international telecommunication unit (ITU) and $3^{rd}$ Generation Partnership Project (3GPP) have proposed three uses of the 5G communication system: enhanced mobile broadband (eMBB), ultra-reliable and low latency communications (URLLC), and massive machine type communication (mMTC).

Currently, the 5G communication system is considering implementation using millimeter wave (mmW) frequency bands (e.g., 60 GHz bands) to accomplish higher data rates. In order to increase the propagation distance by mitigating propagation loss in the 5G communication system, various techniques such as beamforming, massive multiple-input multiple output (MIMO), full dimensional MIMO (FD-MIMO), array antenna, analog beamforming, and large-scale antenna are being considered as possible solutions.

Other techniques, such as evolved small cells, advanced small cells, cloud radio access networks (RAN), ultra-dense networks, device to device (D2D) communications, wireless backhauls, moving networks, cooperative communications, coordinated multi-points (CoMP)s, interference cancellations, hybrid frequency shift keying (FSK), quadrature amplitude modulation (QAM), sliding window superposition coding (SWSC), advanced coding modulation (ACM), filter bank multi carrier (FBMC), non-orthogonal multiple access (NOMA), and sparse code multiple access (SCMA) are also being considered for enhancement of network performance of the 5G communication system.

Additionally, stability of the 5G communication system is not easy to achieve when compared with the 4G communication systems, because of the need to support a data rate that is a few dozen multiples of the legacy 4G communication systems.

For example, when using a beamforming technique to achieve the high data rate required by the 5G communication system, if a line-of-sight (LOS) path cannot be maintained when communicating between a base station and a terminal, instantaneous performance degradation and radio link failure may result. In addition, there is likely to be a lack of coverage (or an abundance of 5G coverage holes) as a result of not having sufficient 5G base stations to cover an entire nation.

In view of the foregoing, there exists a need of a method for operating 5G communication networks with legacy 4G communication networks, i.e., a handover method. For example, it may prove advantageous for a 4G base station to be able to communicate with a terminal that is leaving a 5G communication area and entering a non-5G communication service area.

SUMMARY

The present disclosure has been made to address at least the disadvantages described above and to provide at least the advantages described below.

Accordingly, the present disclosure provides a method for communicating between 4G and 5G communication networks.

In accordance with an aspect of the present disclosure, there is provided a network assignment method of a gateway in a wireless communication system including a first communication network and a second communication network. The method includes receiving, when a terminal is connected to the first communication network, a create session request message from a second mobility management entity associated with a second base station operating the second communication network, allocating second attach information for establishing a bearer between the gateway and the second base station based on first attach information generated for connection to the first communication network, and transmitting a create session response message including the second attach information to the second mobility management entity in response to the create session request message.

In accordance with an aspect of the present disclosure, there is provided a network assignment method of a second mobility management entity in a wireless communication system including a first communication network and a second communication network. The method includes transmitting, when a terminal is connected to the first communication network, a create session request message to a gateway and receiving a create session response message including second attach information allocated based on first attach information generated for connection to the first communication network, from the gateway in response to the create session request message. The second attach information is generated for establishing a bearer between the gateway and a second base station operating the second communication network.

In accordance with an aspect of the present disclosure, there is provided a network connection method of a terminal in a wireless communication system includes a first communication network and a second communication network. The method includes transmitting, when the terminal is connected to the first communication network, an attach request message for connection to the second communication network to a second base station operating the second communication network and receiving an attach accept message including second attach information allocated based on first attach information generated for connection to the first communication network in response to the attach request message. The second attach information is generated for establishing a bearer between the second base station and a gateway.

In accordance with an aspect of the present disclosure, there is provided a gateway for assigning a network in a wireless communication system including a first communication network and a second communication network. The gateway includes a communication unit which communicates with a first mobility management entity associated with a first base station operating the first communication network and a second mobility management entity associated with a second base station operating the second communication network and a controller which controls, when a terminal is connected to the first communication network, the communication unit to receive a create session request message from the second mobility management entity, allocates second attach information for establishing a bearer between the gateway and the second base station based on first attach information generated for connection to the first communication network, and controls the communication unit to transmit a create session response message including the second attach information to the second mobility management entity in response to the create session request message.

In accordance with an aspect of the present disclosure, there is provided a second mobility management entity for assigning a network in a wireless communication system including a first communication network and a second communication network. The second mobility management entity includes a communication unit which communicates with a gateway of the wireless communication system and a controller which controls, when a terminal is connected to the first communication network, the communication unit to transmit a create session request message to the gateway and receive a create session response message including second attach information allocated based on first attach information generated for connection to the first communication network in response to the create session request message. The second attach information is generated for establishing a bearer between the gateway and a second base station operating the second communication network.

In accordance with an aspect of the present disclosure, there is provided a terminal for connecting to a network in a wireless communication system including a first communication network and a second communication network. The terminal includes a communication unit which communicates with a first base station operating the first communication network and a second base station operating the second communication network and a controller which controls the communication unit to transmit, when the terminal is connected to the first communication network through the first base station, an attach request message for connection to the second communication network to the second base station operating the second communication network and receive from the second base station an attach accept message including second attach information generated based on first attach information generated for connection to the first communication network in response to the attach request message. The second attach information is generated for establishing a bearer between the second base station and a gateway.

BRIEF DESCRIPTION OF THE DRAWINGS

The above and other aspects, features and advantages of certain embodiments of the present disclosure will be more apparent from the following detailed description taken in conjunction with the accompanying drawings, in which.

DETAILED DESCRIPTION

Figure 1:
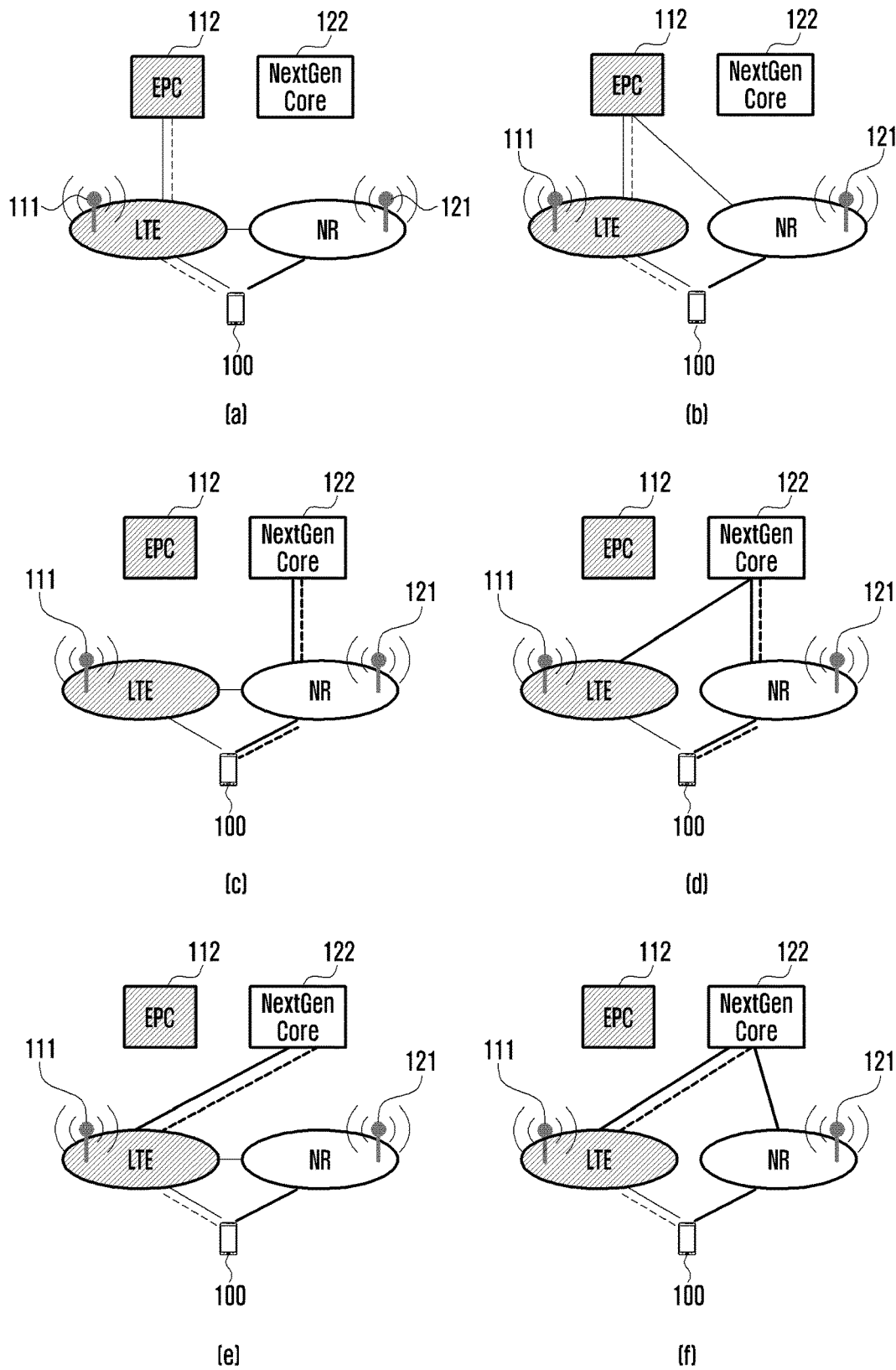
FIG. 1 illustrates wireless communication architectures for interoperation (communication) between 4G and 5G communication networks, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present invention, and similarly, a second element may be referred to as a first element.

When an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present invention may include at least one of an Application-Specific Integrated Circuit (ASIC) chip, a Field-Programmable Gate Arrays (FPGA), and a programmable-logic device for performing operations which has been known or are to be developed hereinafter.

As used herein, the term "base station" is defined herein as an entity connecting a number of other devices to one another and may be interchangeably referred to as BS, node B (NB), evolved node B (eNB), and access point (AP).

As used herein, the term "terminal" is defined as an entity communicating with a base station or another terminal and may be interchangeably referred to as node, mobile station (MS), mobile equipment (ME), device, or user equipment (UE).

An electronic device according to the present disclosure may include a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may also be a home appliance. The home appliance may include a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include a medical device (e.g., a portable medical measuring device such as a blood glucose monitoring device, a heart rate monitoring device, a blood pressure measuring device, a body temperature measuring device, etc., a magnetic resonance angiography (MRA) device, a magnetic resonance imaging (MRI) device, a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM), point of sales (POS) devices or an Internet of Things device (IoT) (e.g., a light bulb, a sensor, an electric or gas meter, a sprinkler device, a fire alarm, a thermostat, a streetlamp, a toaster, sporting good, a hot water tank, a heater, a boiler, etc.).

The electronic device may include at least one of a part of furniture or a building/structure, an electronic board, an electronic signature receiving device, a projector, and a measuring instrument (e.g., a water meter, an electric meter, a gas meter, and a radio wave meter).

Further, the electronic device is not limited to the aforementioned devices, and may include an electronic device according to the development of new technology. The electronic device may be a combination of one or more of the aforementioned various devices. (The electronic device may also be a flexible device.)

Herein, the term "user" may indicate a person using an electronic device or a device (e.g., an artificial intelligence electronic device) using an electronic device.

FIG. 1 illustrates various wireless communication architectures for interworking between 4G and 5G communication networks, according to an embodiment of the present disclosure.

In FIG. 1, each wireless communication system may include an evolved packet core (EPC) 112 as a 4G core network, an eNB 111 as a 4G LTE base station, a next generation core (NextGen core) 122 as a 5G core network, a next generation node B (gNB) 121 as a 5G new radio (NR) base station, and a terminal 100. In FIG. 1, the solid lines represent the user plane data flow and the dotted lines represent the control plane signal flow.

FIG. 1 shows the architectural options where the gNB 121 connects to the EPC 112 with the assistance of the eNB 111 (see (a) and (b), for example). FIG. 1 also shows the architectural options where the eNB 111 connects to the NextGen core 122 with the assistance of the gNB 121 (see (c) and (d), for example). FIG. 1 also shows the architectural options where the gNB 121 connects to the NextGen core 122 with the assistance of the eNB 111 (see (e) and (f), for example).

In (a) and (b) of FIG. 1, it may be possible to use a 5G radio access network (RAN) with the assistance of the EPC 112. In (a) and (b) of FIG. 1, the wireless communication systems are used only as interim solutions for migration because only the 4G communication network data path is available.

Accordingly, the architectural options of (c) to (f) of FIG. 1, in which the eNB 111 connects to the NextGen core 122 through a separate control signaling path, can be considered as preferred interworking solutions. In this case, however, it may be necessary to define a new interface between the eNB 111 and the NextGen core 122; thus, there may be a need to upgrade the eNB 111 for connection to the NextGen core 122. It is assumed that the eNB 111 is an upgraded evolved LTE eNB.

Also, it is assumed that the wireless communication systems of FIG. 1 are all based on the non-stand-alone (NSA) network structure in which one network has the control right. In such a structure, one base station takes all control paths of the other base stations; thus, the base stations having no control path depend on the primary base station with the control path, i.e., it can be difficult for the communication networks to operate independently.

For example, in (e) or (f) of FIG. 1, the 4G communication network has the control on the 5G communication network such that it is impossible to use the 5G communication service in an area where the 4G communication service is not provided. Also, during a handover across a boundary between the coverage areas of a 4G base station, the 5G communication service may be cut off.

Such a dependency problem between 4G and 5G radio access technologies (RATs) can sometimes affect the communication network management and communication service deployment strategies of a network operator. For example, it may be necessary to upgrade the 4G base stations to guarantee interoperability between 4G and 5G communication networks. It may also be necessary to perform an interoperability test between 4G and 5G base stations whenever a new functionality is added, or the system is upgraded for performance enhancement. Furthermore, if the vendors of the 4G and 5G base stations are different from each other, it may be more difficult to achieve complete interoperability. Such a situation may make it difficult, if not impossible, to perform the interoperability test, or cause a significant latency. In particular, a 4G network vendor that has deployed the 4G system is likely to be selected as the 5G network vendor again in a bidding competition for a 5G network facility, and this difficulty in achieving interoperability could be contrary to existing multi-vendor RAN policy.

Figure 2:
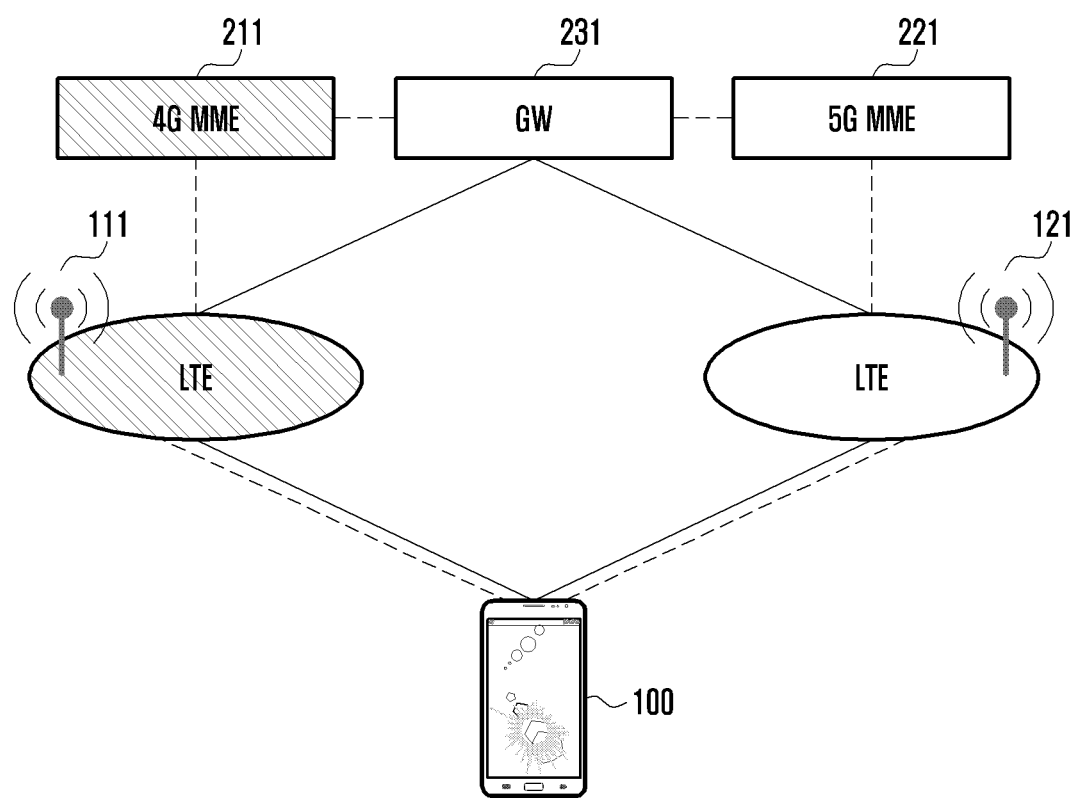
FIG. 2 is a diagram of a wireless communication system architecture for interworking between 4G and 5G communication networks, according to an embodiment of the present disclosure.

FIG. 2 is a diagram of the wireless communication system architecture for facilitating interworking between 4G and 5G communication networks, according to an embodiment of the present disclosure.

In FIG. 2, the wireless communication system connects a 4G mobility management entity (4G MME) 211 and a 5G mobility management entity (5G MME) 221 to each other, and the wireless communication system is designed such that the control plane signal lines of the 4G and 5G communication networks are separated and represented by the dotted lines, whereas the user plane signal lines of the 4G and 5G communication networks are concentrated on a gateway 231, which acts as an anchor node and is represented by the solid lines. That is, the wireless communication system can be configured to facilitate interworking between the standalone 4G and 5G communication networks.

Figure 3:
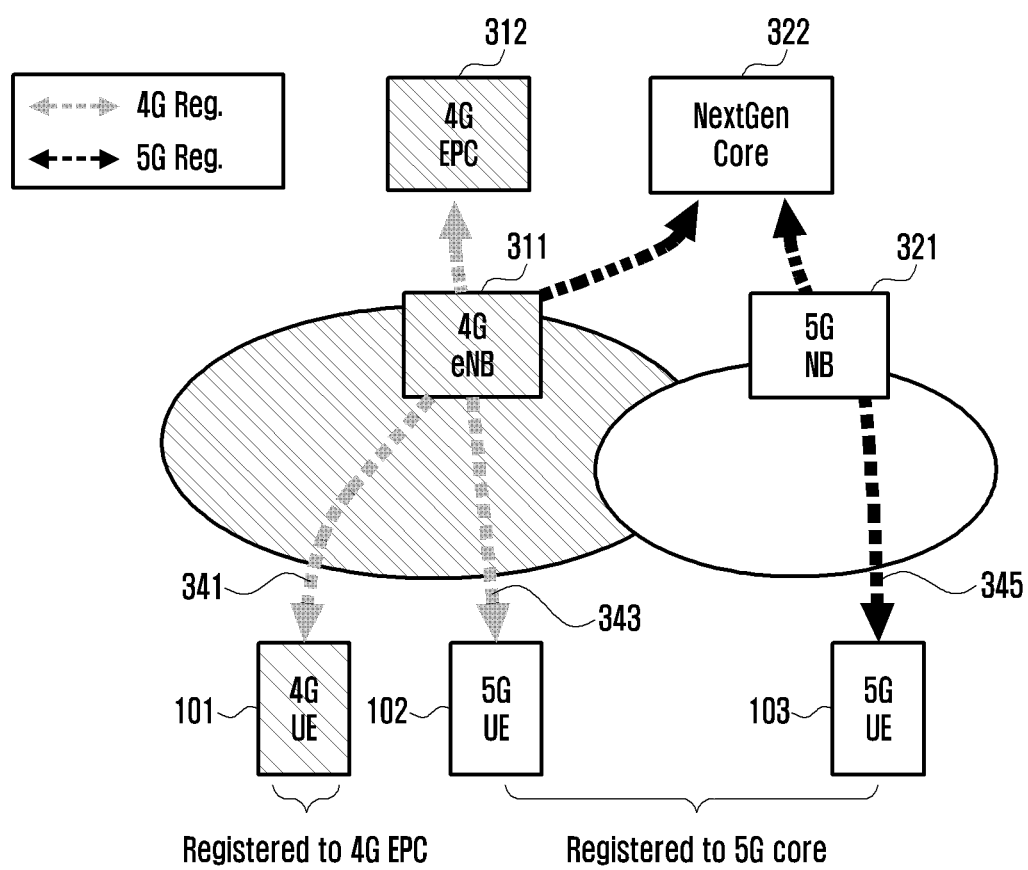
FIGS. 3 and 4 are diagrams of terminals that connect between 4G and 5G communication networks, according to an embodiment of the present disclosure.
Figure 4:
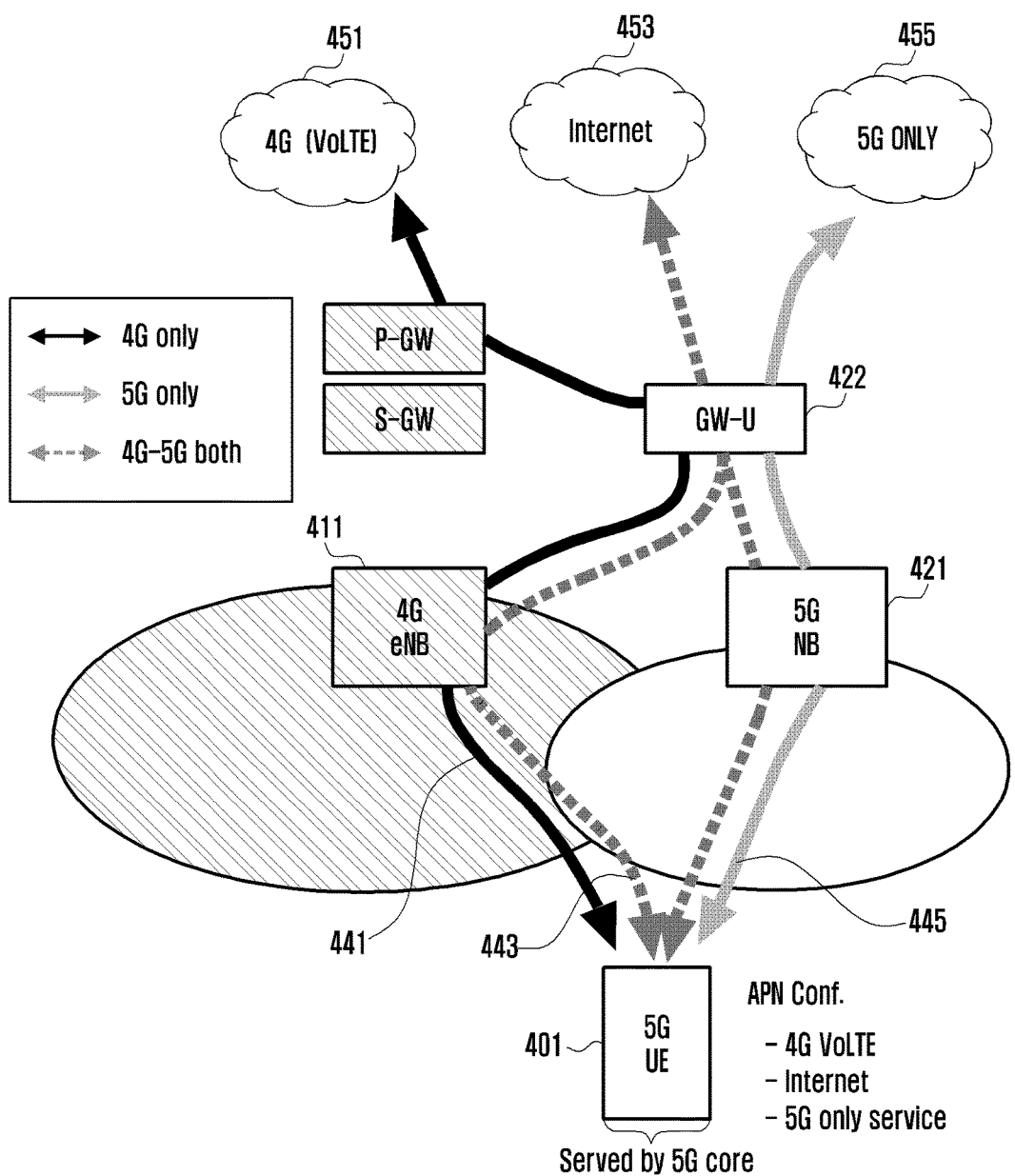

FIGS. 3 and 4 are diagrams of scenarios in which terminals connect to 4G and 5G communication networks, according to an embodiment of the present disclosure.

In FIG. 3, a legacy 4G UE 101 may connect to an EPC 312 as a 4G core network via a 4G eNB 311 as indicated by the dotted line 341. A 5G UE 102 may connect to a NextGen core 322 as a 5G core network via the 4G eNB 311 as indicated by the dotted line 343. A 5G UE 103 may connect to the NextGen core 322 via a 5G NB 321 as indicated by the dotted line 345.

In FIG. 4, the 5G UE 401 may support multiple access point names (APNs).

Examples of available APNs may include an APN corresponding to a voice-over-LTE (VoLTE) service that uses the 4G communication network, an APN corresponding to a 5G service 453 that uses the 5G communication network, and an APN corresponding to an internet service 455 as a multi-link service that uses the 4G and 5G communication networks selectively. When using a multi-link service, it may be necessary to perform additional operations such as switching, combining, and splitting between 4G and 5G communication networks.

In FIG. 4, the 5G UE 401 may receive the VoLTE service 451 via the 4G eNB 411 and a user plane gateway (GW-U) 422. The 5G UE 401 may receive the 5G service 455 via the 5G NB 421 and the GW-U 422. The 5G UE 401 may also receive the internet service 453 via the 4G eNB 411 or 5G NB 421 and the GW-U 422.

Figure 5:
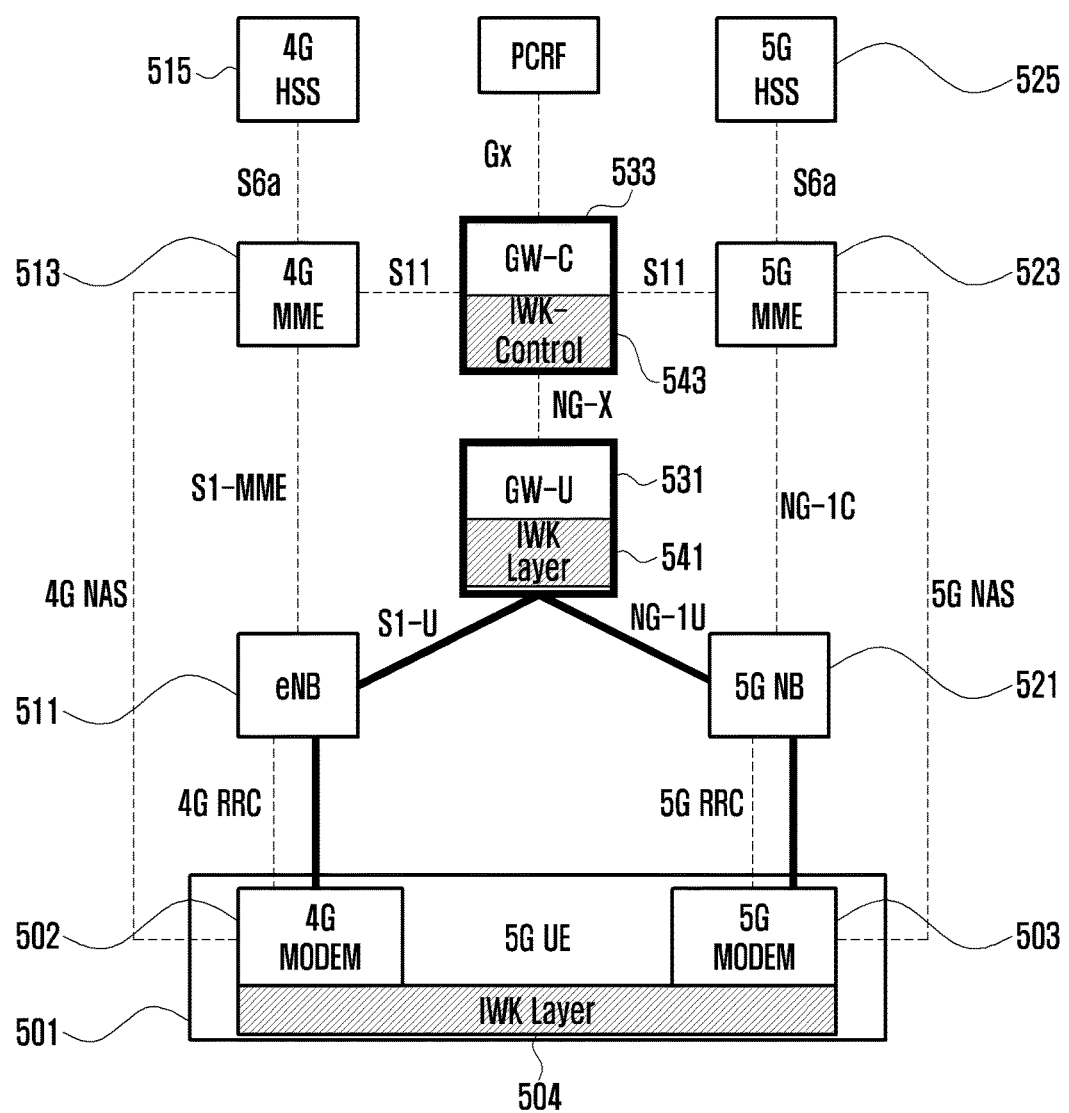
FIG. 5 is a diagram of an architecture of a wireless communication system, according to an embodiment of the present disclosure.

FIG. 5 is a diagram of architecture of a wireless communication system, according to an embodiment of the present disclosure.

Although defined with specific terms hereinbelow, the network elements and interfaces shown in FIG. 5 are not limited thereto, and they may be used interchangeably with network elements and interfaces associated with a 3GPP communication scheme.

A system architecture evolution gateway (SAE-GW) that integrates a serving gateway (S-GW) and a packet data network gateway (P-GW), which can represent legacy 4G core network entities, can be separated into a control plane and a data plane. For example, the SAE-GW may be split into a gateway control plane (GW-C) 533 and a gateway user-plane (GW-U) 531. The S-GW of the EPC may operate as a common anchor in the 4G communication network.

A 4G MME 513 may communicate with the GW-C 533 through an S11 interface. The 4G eNB 511 may communicate with the GW-U 531 through an S1-U interface.

For independent operations of the 4G and 5G communication networks, the wireless communication system may include a 4G home subscriber server (4G HSS) 515 and a 5G home subscriber server (5G HSS) 525 implemented separately for an independent authentication procedure between a UE and a network.

For independent operations of the 4G and 5G communication networks, the wireless communication system may include an interworking control (IWK-Control) 543 and an interworking-layer (IWK-Layer) 541.

The IWK-Control 543 resides in the GW-C 533 to distinguish between connections with the 4G and 5G MMEs 513 and 523, and controls interoperation between the 4G and 5G MMEs 513 and 523.

For example, if a management request message indicating a creation, a change, or a deletion of an EPC bearer as a logical channel is received from the 4G MME 513 or the 5G MME 523 via a terminal, an eNB, a gateway, or the IWK-Control 543 may identify the MME that has transmitted the management request message and perform a corresponding control function for interworking between the 4G and 5G communication networks. The IWK-Control 543 may convert the management request message to an appropriate format and transmit the converted message to the GW-U 531 or transmit a response message to the 4G MME 513 or the 5G MME 523 in response to the management request message. The 4G and 5G MMEs 513 and 523 communicate with the IWK-Control 543 through standalone-based standard interfaces, and the interworking operations remain transparent to the base station and terminal.

The IWK-Layer 541 resides in the GW-U 531, which binds the 4G and 5G communication networks to generate multiple GPRS tunneling protocol (GTP) tunnels with a bearer ID. A terminal 501 may support interworking between the 4G and 5G communication networks by connecting its 4G and 5G modems 502 and 503 to the respective GTP tunnels.

The IWK-Layer 541 may transmit or receive data to or from the UE 501 via one or both of the 4G eNB 511 and 5G NB 521. With respect to forwarding data from the 5G NB 521 to the 4G eNB 511 (indirect forward), the IWK-Layer 541 may distinguish the forwarded data from the uplink data and deliver the forwarded data to the 4G eNB 511.

The UE 501 may include a 4G modem 502 and a 5G modem 503, each with separate radio resource control (RRC) connections. The UE 501 may include an IWK-Layer 504 for supporting interworking between the 4G and 5G modems 502 and 503.

In the wireless communication system of FIG. 5, if the UE 501 transmits a connection request, the wireless communication system may perform a full bearer setup procedure for the case of an initial connection request. A bearer may be referred to as a data transfer link established between the UE 501 and the gateway for transmitting internet protocol (IP) traffic with a specific quality of service (QoS). The wireless communication system may establish an evolved UMTS terrestrial radio access network (E-UTRAN) radio access bearer (E-RAB) subordinately based on the information of the previously established connection, rather than performing the full bearer setup, by binding with the previously established connection.

That is, the wireless communication system may establish a link with the same evolved packet system bearer (EPS-bearer) ID and IP address as the previously established link to transmit/receive data through the links selectively in one logical session.

A description of a method for managing link state of the IWC-Control of the wireless communication is now herein described.

The link connection state management of an EPS mobility management (EMM) and EPS connection management (ECM) may be performed by an MME corresponding to each link. A mutual interworking unit may trace and manage the link connection state in separation from the MME to perform appropriate interworking procedures with the 4G and 5G communication networks.

Figure 6:
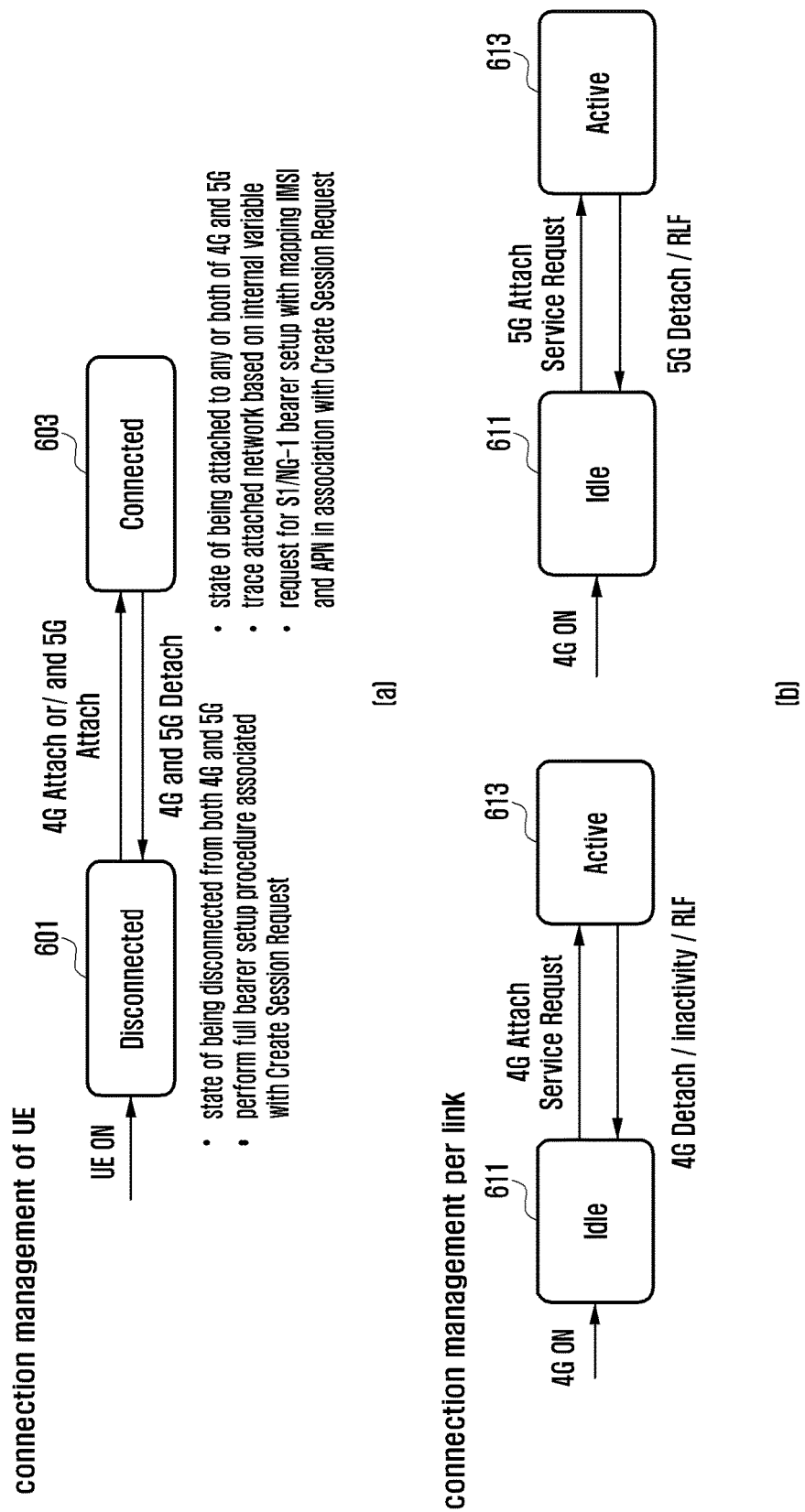
FIG. 6 is a diagram of a connection state management procedure for interworking between 4G and 5G communication networks, according to an embodiment of the present disclosure.

FIG. 6 is a diagram of a connection state management procedure for interworking between 4G and 5G communication networks, according to an embodiment of the present disclosure.

The link connection station management may include a UE connection management as shown in (a) of FIG. 6 and a per-link connection management as shown in (b) of FIG. 6.

In (a) of FIG. 6, the UE connection management may be performed for the purpose of determining whether a connection request from an MME is an initial connection request or a connection request for binding with the previous connection.

For example, if the terminal is not attached to either a 4G network or a 5G network, it may be in a "disconnected" state 601. If a session establishment request message is received, an interworking unit may perform a full bearer setup procedure and the terminal can transition to a "connected" state 603.

If the UE in the connected state 603 receives the session establishment request message, the interworking unit may request for bearer setup to map to a previous connection through an S1 link or an NG-1 link based on a UE identifier, e.g., international mobile subscriber identity (IMSI) and access point name (APN). It may be possible to determine whether the terminal is attached to a 4G network or a 5G network or both the 4G and 5G networks by tracing an internal variable.

In (b) of FIG. 6, a per-link connection management of the terminal is shown. The interworking unit may determine whether the link state is an "idle" state 611 or an "active" state 613. The interworking unit may determine whether to use one or both of the 4G and 5G communication network links based on the determined link state.

In (b) of FIG. 6, if the UE attempts to connect through the 4G network or the 5G network, the link state remains in an "active" 613, and if a detach, an inactivity, or an RLF occurs, the corresponding link may transition to the idle state 611.

FIGS. 7A, 7B, 8A, and 8B are diagrams of network access procedures of a UE in a wireless communication system, according to an embodiment of the present disclosure.

As described above, the initial attachment procedure and the extra attachment procedure may be performed differently.

Figure 7A:
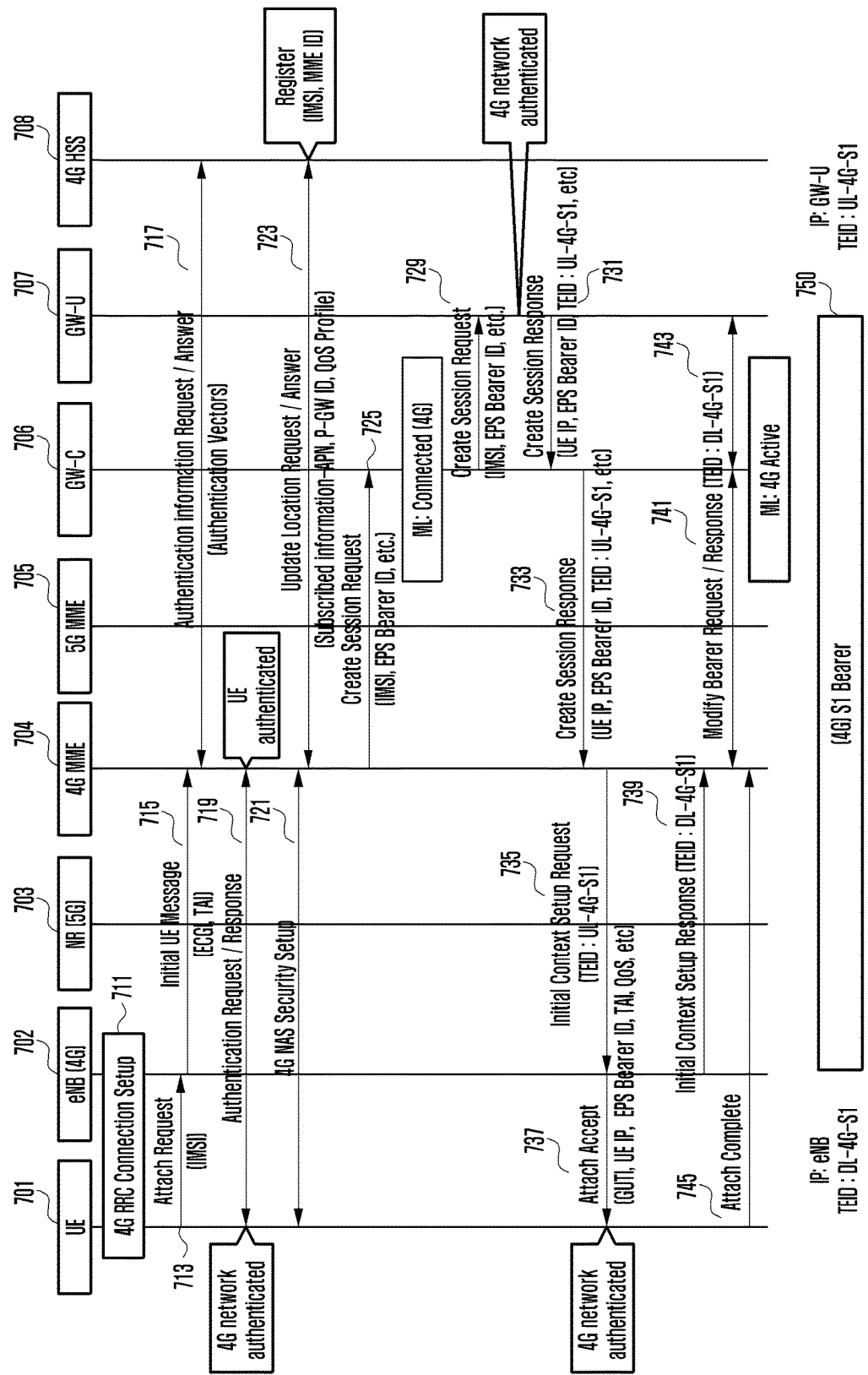
FIGS. 7A, 7B, 8A, and 8B are diagrams of network access procedures of a UE in a wireless communication system, according to an embodiment of the present disclosure.
Figure 8A:
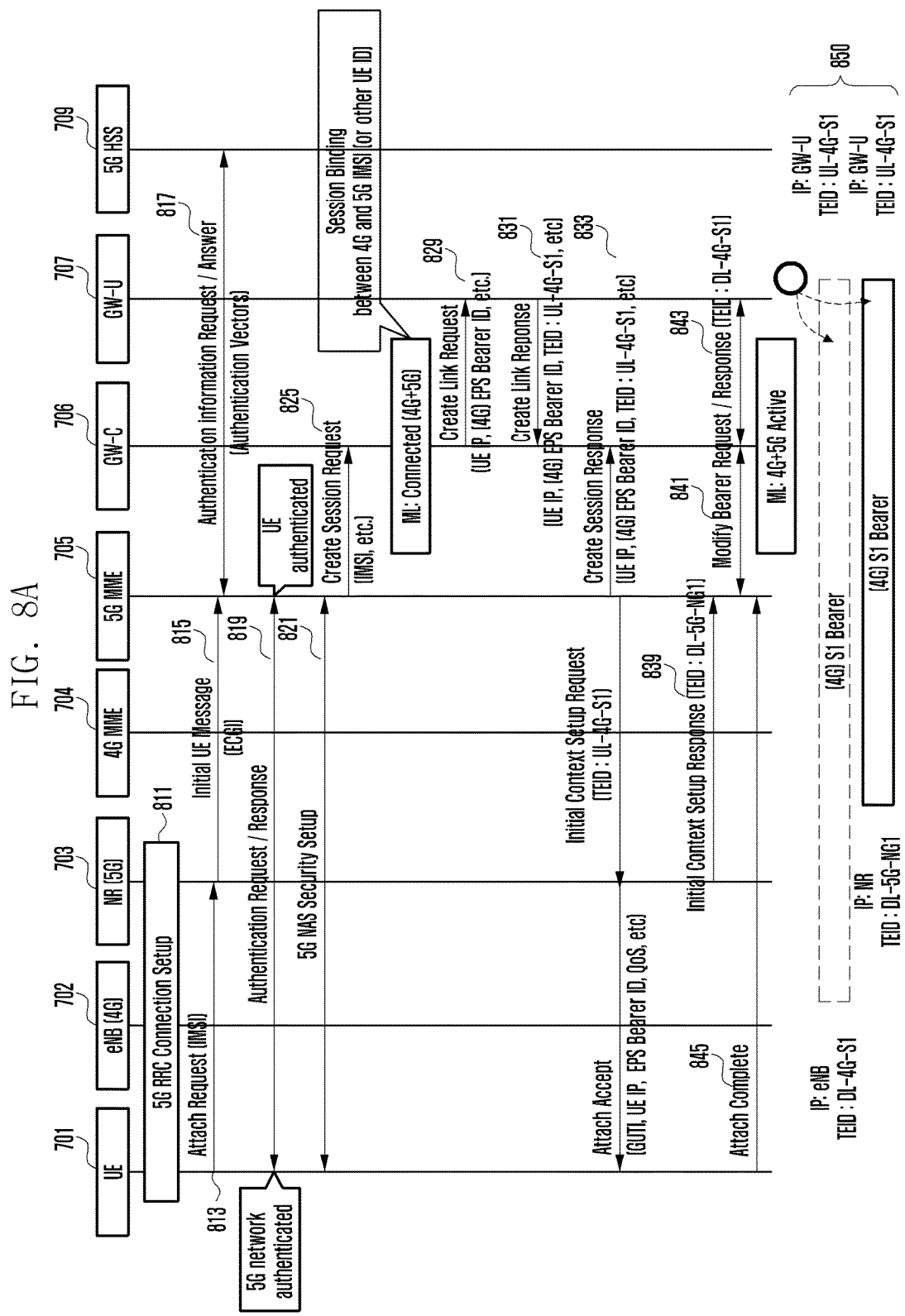

FIG. 7A is a signal flow diagram illustrating an initial attachment procedure of a UE 701, and FIG. 8A is a signal flow diagram illustrating an extra attachment procedure of a UE.

In FIG. 7A, the UE 701 may perform a full bearer setup procedure for initial attachment. In FIG. 8A, the terminal 701, which is in the state of being connected to a first communication network (e.g., 4G network), may attempt to attach to a second communication network (e.g., 5G network). It may be necessary to map to the bearer established previously in the first communication network and then perform a bearer setup procedure for establishing an E-RAB subordinately. Although FIGS. 7A, 7B, 8A, and 8B are directed to when the 5G network attachment procedure is performed while the UE is connected to a 4G network, the procedures may be performed, in a similar fashion, when the 4G network attachment procedure is performed while the UE is connected to the 5G network.

With reference to FIG. 7A, if a 4G RRC connection is established between the UE 701 and a 4G eNB 702 at step 711, the UE 701 may transmit an Attach Request message including an international mobile subscriber identity (IMSI) as a communication network subscriber identifier to the 4G eNB 702 at step 713.

The 4G eNB 702 may transmit an Initial UE message to a 4G MME 704 at step 715. The Initial UE message may include the IMSI as a communication network subscriber identifier, an E-UTRAN cell global identifier (ECGI) as an identifier of a cell where the UE 701 is located, and a tracking area identifier (TAI) as an identifier of a tracking area where the UE is located.

At step 717, the 4G MME 704 may transmit an Authentication Information Request message to a 4G HSS 708 and receive an Authentication Information Response message in response to the Authentication Information Request message. The Authentication Information Response message may include authentication vector (AV) information for UE authentication.

At step 719, the 4G MME 704 may transmit to the UE 701 an Authentication Request message including part of the AV information received from the 4G HSS 708. The UE 701 may compare an authentication value of the AV information with an authentication value that it generated and, if the authentication values match, trust the 4G communication network. The UE 701 may transmit to the 4G MME 704 an Authentication Response message including an authentication response parameter (RES) in response to the Authentication Request message. The 4G MME 704 may compare the RES contained in the Authentication Response message with an expected RES (XRES) received from the 4G HSS 708 to authenticate the UE 701.

If the UE 701 is authenticated successfully, the UE 701 and the 4G MME 704 may perform a 4G non-access stratum (NAS) security setup procedure for exchanging NAS messages at step 721.

The 4G MME 704 may transmit an Update Location Request message to the 4G HSS 708 at step 723. The 4G HSS 708 may register an IMSI as the identifier of the UE 701 and an MME ID as an identifier of the 4G MME 704 included in the Update Location Request message. The 4G HSS 708 may transmit to the 4G MME 704 a QoS profile corresponding to the registered IMSI. The QoS profile may be registered with the 4G HSS 708 during the procedure of subscription to a service of a communication operator.

The 4G MME 704 may transmit a Create Session Request message to a GW-C 706 at step 725. The Create Session Request message may include the IMSI of the UE 701 and an EPS bearer ID.

The IWK-Control of the GW-C 706 may identify the initial attach attempt and transmit to the GW-U 707 a Create Session Request message for establishing a bearer through an EPS bearer setup procedure at step 729. The Create Session Request message may include the IMSI of the UE and the EPS bearer ID.

The GW-U 707 may allocate first attachment information for establishing a bearer between the GW-U 707 and the 4G eNB 702. The first attachment information may include an IP address of the UE 701, an EPS bearer ID, and an uplink 4G S1 tunnel ID.

The GW-U 707 may transmit to the GW-C 706 a Create Session Response message including the first attachment information at step 731 in response to the Create Session Request message. At step 733, the GW-C 706 may transmit to the 4G MME 704 the Create Session Response received form the GW-U 707.

The 4G MME 704 may transmit to the 4G eNB 702 an Initial Context Setup Request message including the uplink 4G S1 tunnel ID at step 735.

At step 737, the 4G eNB 702 may transmit an Attach Accept message to the UE 701 in response to the Attach Request message that the UE 701 transmitted at step 713. The Attach Accept message may include a globally unique temporary identifier (GUTI), an IP address, an EPS bearer ID, a TAI, and a QoS.

The UE 701 may acquire the IP address from the Attach Accept message and register the IP address.

At step 739, the 4G eNB 702 may transmit an Initial Context Setup Response message to the 4G MME 704 in response to the Initial Context Setup Request message that the 4G MME 704 transmitted at step 735. The Initial Context Setup Response message may include a downlink 4G S1 tunnel ID.

Consequently, a 4G S1 bearer may be established between the GW-C 706 and the 4G eNB 702 at step 750.

To modify the bearer, the 4G MME 704 and the GW-U 707 may exchange a Modify Bearer Request and Modify Bearer Response messages via the GW-C 706 through steps 741 and 743.

Afterward, the UE 701 may transmit an Attach Complete message to the 4G MME 704 to complete the attachment procedure at step 745.

Figure 7B:
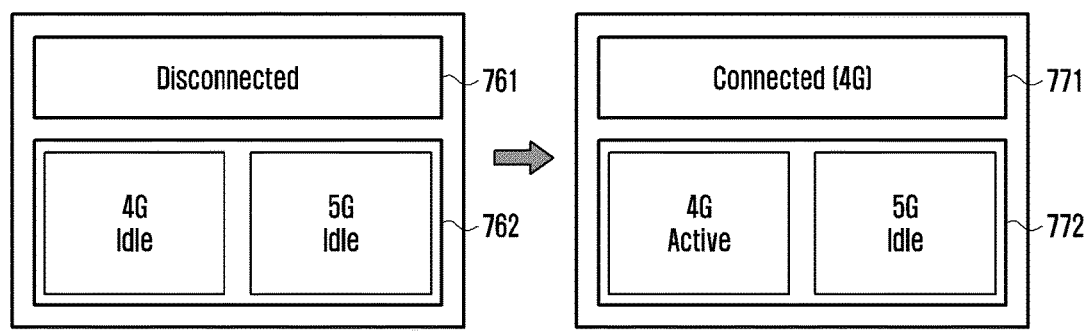

The connection state of the UE 701 may transition from a "disconnected" state 761 to a "4G-connected" state 771, as shown in FIG. 7B.

Also, the link state of the interworking unit of the GW-C 706 may transition from a "4G idle-5G idle state" 762 to a "4G active-5G idle state" 772, as shown in FIG. 7B.

FIG. 8A is a signal flow diagram illustrating an extra attachment procedure of the UE 701.

In FIG. 8A, the UE 701 may be in a state of being connected to a first communication network (e.g., 4G network).

If a 5G RRC connection is established between the UE 701 and the 5G NB (NR (5G)) 703 at step 811, the UE 701 may transmit an Attach Request message including its IMSI to the 5G NB 703 at step 813.

The 5G NB 703 may transmit an Initial UE message to a 5G MME 705 at step 815. The Initial UE message may include the IMSI of the UE 701 and an ECGI as an identifier of a cell where the UE 701 is located.

At step 817, the 5G MME 705 may transmit an Authentication Information Request message to a 5G HSS 709 and receive an Authentication Information Response message from the 5G HSS 709 in response to the Authentication Information Request message. The Authentication Information Response message may include AV information for UE authentication.

The 5G MME 705 may transmit to the UE 701 at step 819 an Authentication Request message including part of the AV information received from the 5G HSS 709. The UE 701 may compare an authentication value of the AV information with an authentication value that it generated and, if the authentication values match, trust the 5G communication network. The terminal 701 may transmit to the 5G MME 705 an Authentication Response message including an authentication response parameter (RES) in response to the Authentication Request message. The 5G MME 705 may compare the RES contained in the Authentication Response message with an XRES received from the 5G HSS 709 to authenticate the UE 701.

If the UE 701 is authenticated successfully, the UE 701 and the 5G MME 705 may perform a 5G NAS security setup procedure for exchanging secure NAS messages at step 821.

The 5G MME 705 may transmit a Create Session Request message to the GW-C 706 at step 825. The Create Session Request message may include the IMSI of the UE 701.

The IWK-Control of the GW-C 706 may identify the re-attach attempt and transmit to the GW-U 707 a Create Link Request message at step 829 for establishing an E-RAB through session binding between the 4G and 5G IMSIs. The Create Link Request message may include an IP address for use in the 4G communication network and an EPS bearer ID.

The GW-U 707 may allocate second attachment information for establishing a bearer between the GW-U 707 and the 5G NB 705 based on the first attach information that has been already generated for attachment to the 4G communication network. The second attachment information may include an IP address of the UE 701, a 4G EPS bearer ID, and a 4G uplink S1 tunnel ID, which may be identical to those generated for attachment to the 4G communication network.

At step 831, the GW-U 707 may transmit to the GW-C 706 a Create Link Response message including the second attachment information in response to the Create Link Request message.

At step 833, the GW-C 706 may transmit to the 5G MME 705 a Create Session Response message including the second attachment information in response to the Create Session Request message.

The 5G MME 705 may transmit to the 5G NB 703 an Initial Context Setup Request message including an uplink 4G S1 tunnel ID at step 835.

At step 837, the 5G NB 703 may transmit an Attach Accept message to the UE 701 in response to the Attach Request message that the UE 701 transmitted at step 813. The Attach Accept message may include a GUTI, an IP address, an EPS bearer ID, a TAI, and QoS.

At step 839, the 5G NB 703 may transmit an Initial Context Setup Response message to the 5G MME 705 in response the Initial Context Setup Request message that the 5G MME 705 transmitted at step 835.

Consequently, a 5G S1 bearer 850 may be established between the GW-U 707 and the 5G NB 703 when the 4G S1 bearer is established between the GW-U 707 and the 4G eNB 702. That is, it may be possible to assign a single uplink S1 tunnel ID and two downlink S1 tunnel IDs corresponding to the respective 4G eNB 702 and 5G NB 703 in association with a GTP tunnel for the same logical session. This makes it possible to use the links selectively for data transmission/reception depending on policy, algorithm, and service.

To modify the bearer, the 5G MME 705 and the GW-U 707 may exchange Modify Bearer Request and Modify Bearer Response messages via the GW-C 706 through steps 841 and 843.

Afterward, the UE 701 may transmit an Attach Complete message to the 5G MME 705 to complete the attachment procedure at step 845.

Figure 8B:
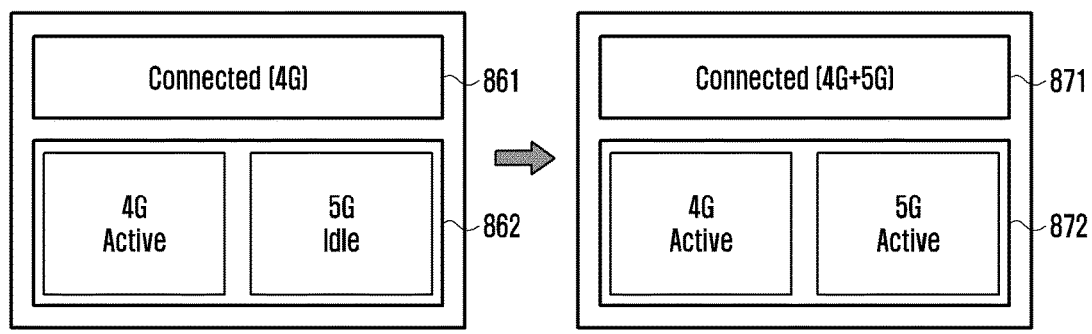

The connection state of the UE 701 may transition from a "4G connected" state 861 to a "4G-5G connected" state 871 for binding the 4G and 5G communication networks, as shown in FIG. 8B.

Also, the link state of the interworking unit may transition from a "4G active-5G idle" state 862 to a "4G active-5G active" state 872, as shown in FIG. 8B.

The link state change, such as an uplink S1 connection release, may occur when a link inactivity or an RLF event is detected.

The GW-C 706 may receive the Modify Bearer Request message from the 4G MME 704 at step 741 of FIG. 7A or from the 5G MME 705 at step 841 of FIG. 8A and, upon receipt of the Modify Bearer Request message, update the link connection state and forward the Bearer Modification Request message to the GW-U 707.

If a Delete Session Request message is received, the GW-C 706 may determine whether a link is maintained when the other link is released and, if so, modify the Delete Link Request message to indicate deletion of only the E-RAB bearer of the corresponding link and transmit the modified Delete Link Request message to the GW-U 707. If the GW-C 706 transmits a Delete Session Response message to the corresponding MME in response to the Delete Session Request message, the Delete Session Response message may be generated in a standard message format.

Figure 9:
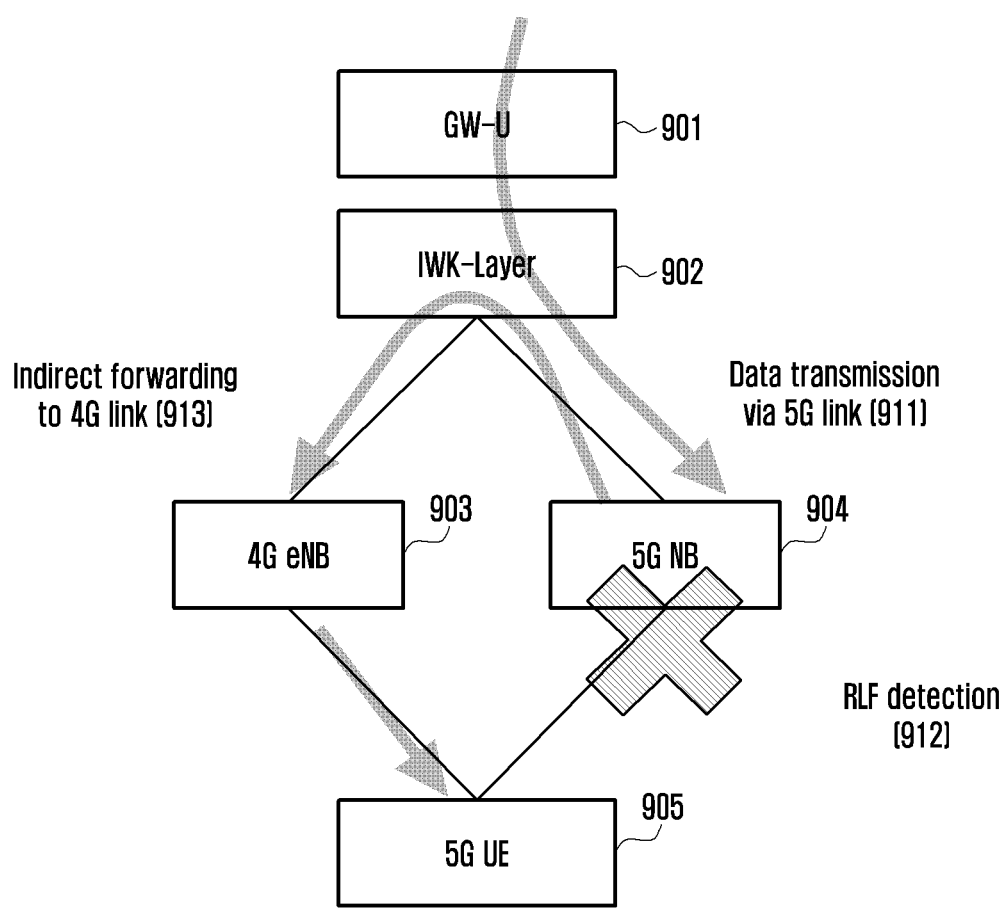
FIG. 9 is a diagram of a lossless forwarding procedure in a wireless communication system, according to an embodiment of the present disclosure.

FIG. 9 is a diagram of a lossless forwarding procedure in a wireless communication system, according to an embodiment of the present disclosure.

Unlike on a 4G link, loss of signal may occur abruptly on a 5G link and thus the UE encounters RLF. It, therefore, may prove advantageous to perform lossless switching from the 5G link to the 4G link.

When the RLF occurs abruptly in the active state of the 5G link of the IWK-Layer, it may prove advantageous to implement a procedure for retransmitting the data transmitted already to the 5G NB to the 4G eNB.

In FIG. 9, the IWK-Layer 902 of the GW-U 901 may route the data addressed to a 5G UE to a 5G NB 904 through a 5G link at step 911 of FIG. 9.

The 5G NB 904 may detect RLF on the 5G link at step 912.

The 5G NB 904 may transmit back the data buffered in its buffer to the GW-U 901 at step 913.

Accordingly, it may be necessary for the IWK-Layer 902 of the GW-U 901 to distinguish between the uplink data and the data transmitted back by the 5G NB 904 (i.e., indirect forwarding data).

The IWK-Layer 902 may transition the 5G link state to "idle" state and route the data being received subsequently to the 4G eNB 903.

A UE may be equipped with a 4G modem and a 5G modem that are independently responsible for RRC and NAS operations with the respective 4G and 5G communication networks.

The UE may have one IMSI, under the assumption of a single universal subscriber identity module (USIM), and use the ISMI to attach to both the 4G and 5G communication networks.

The UE may distinguish among a 4G communication network-specific service, a 5G communication network-specific service, and a network-transparent service (i.e., services available over both the 4G and 5G communication networks) based on the APN.

The UE may request to a 4G MME for the 4G communication network-specific service through the 4G NAS and to a 5G MME for the 5G communication network-specific service through the 5G NAS. The UE may also request to the 4G MME and 5G MME for the network-transparent service through the 4G and 5G NASs.

The 4G and 5G MMEs may independently request to the same GW-C for establishing sessions. The GW-C may determine whether to provide the 4G and 5G communication network-specific services simultaneously based on the APN.

If it is determined that the session request is made initially based on the IMSI and APN, the GW-C may generate a bearer context. If it is determined that the same session request has been made, the GW-C may establish a GTP tunnel between the eNB (or 5G NB) with the GW-C in the previously established bearer context.

When the APN uses both the 4G and 5G communication networks, the GW-C may provide a function of selecting between the 4G and 5G links. For example, the GW-C may be configured to select a 5G link with priority when the 5G link is available and a 4G link when a 5G link is not available.

A UE on the move may maintain the connection over a 4G link through handover between eNBs according to the LTE standard (S1 and X2 handovers).

When the UE moves out of a 5G radio coverage, the 5G NB may release the S1-U interface connection with the gateway. When the UE enters a 5G radio coverage, the 5G NB may establish a connection with the gateway through the S1-U interface. If the UE moves between 5G cells of the 5G NB, the connection between the 5G NB and the GW-C may be maintained.

Figure 10:
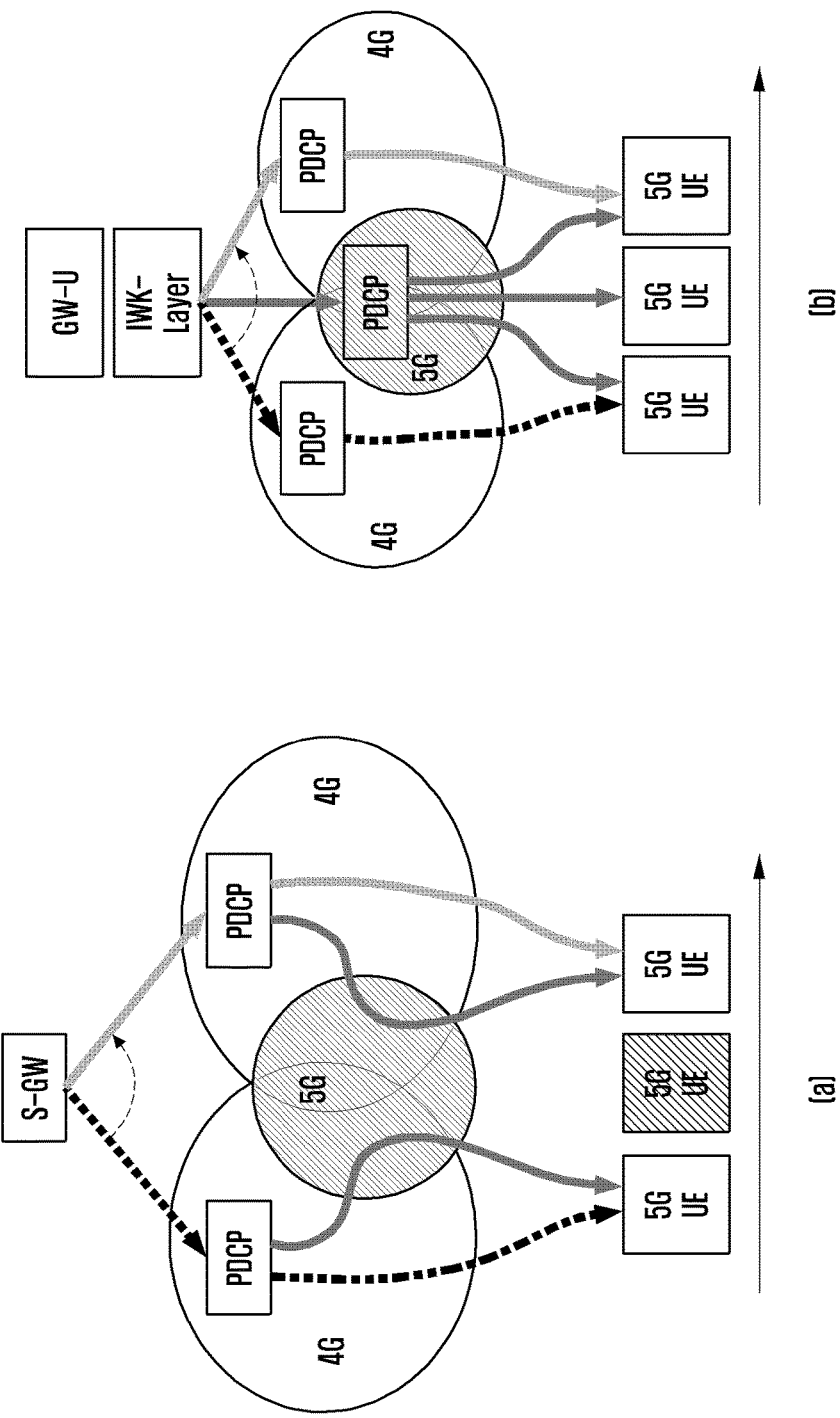
FIG. 10 is a diagram of an operation of a UE on the move, according to an embodiment of the present disclosure.

FIG. 10 is a diagram of an operation of a UE on the move, according to an embodiment of the present disclosure.

FIG. 10, at (a), shows a non-standalone (NSA) architecture of a wireless communication system in which one of the 4G and 5G networks has control.

In (a) of FIG. 10, if 4G services are not supported or a link is cut off, a 5G service cannot be provided. Thus, the 5G service being provided to the UE on the move may be stopped because of an attempted handover to a 4G cell, which can result in a radio interruption time that may range from 40 ms to 80 ms.

FIG. 10, at (b), shows an interworking architecture for standalone operations of the 4G and 5G communication networks.

In (b) of FIG. 10, a UE may use a 4G link or both 4G and 5G links on the move. That is, the UE may transmit data on a link in the currently active state without any handover between 4G and 5G networks.

The IWK-Layer of the GW-U is capable of switching between 4G eNBs to transmit data to the UE on the move through a 4G link during the connection to the 4G eNBs and through a 5G link during the switching between the 4G eNBs.

Figure 11:
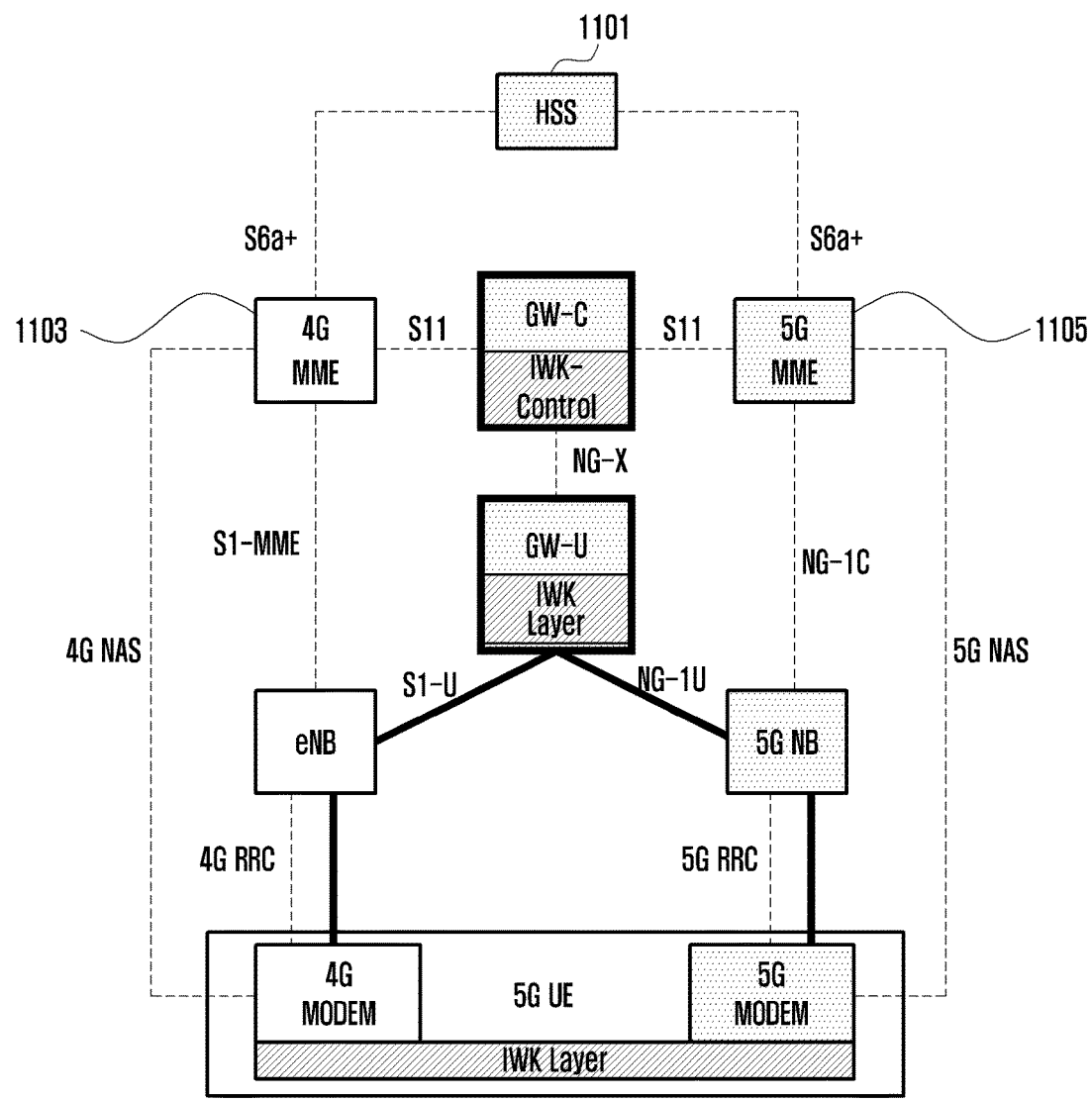
FIGS. 11 and 12 are diagrams of various architectures of a wireless communication system, according to an embodiment of the present disclosure.
Figure 12:
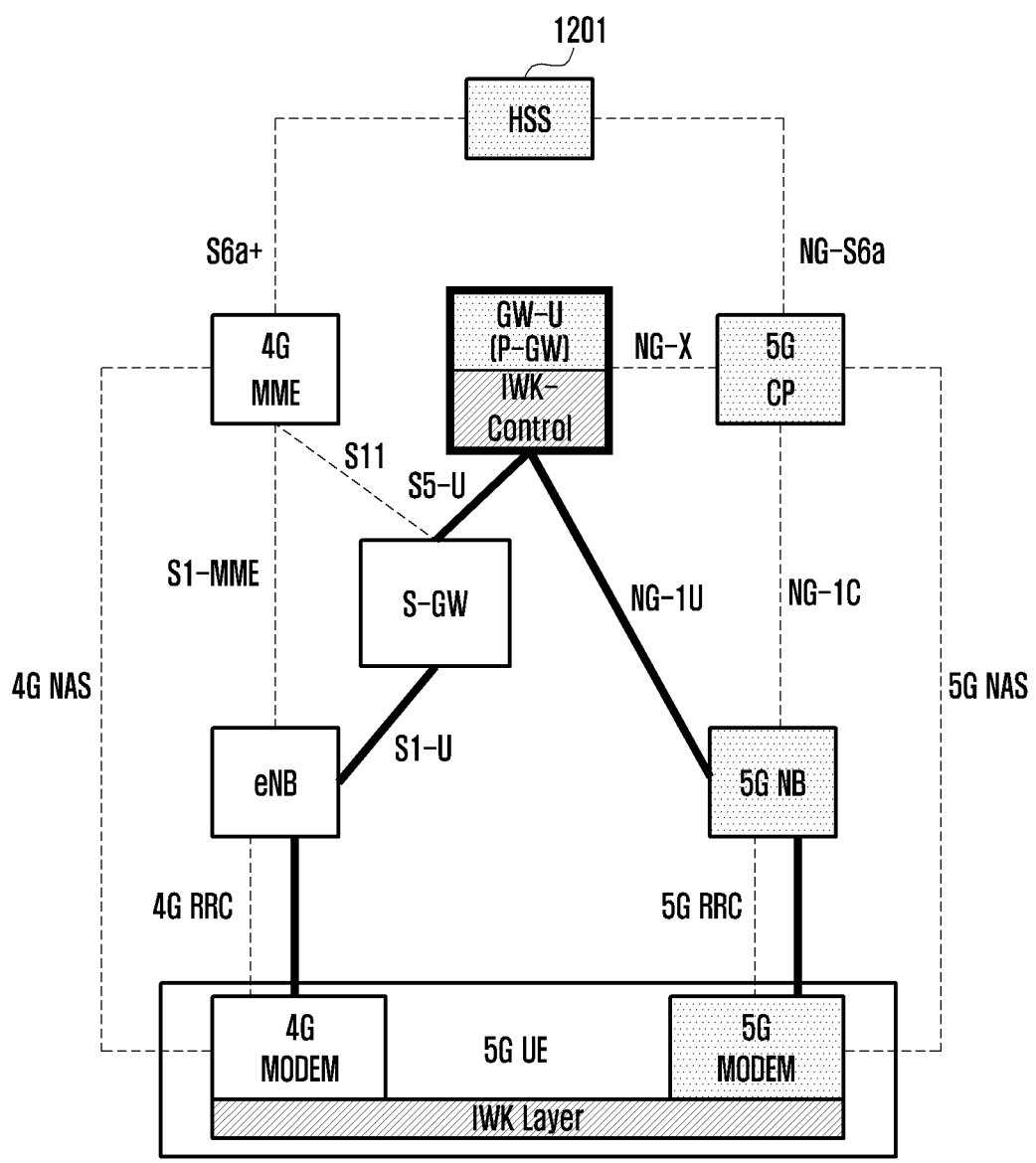

FIGS. 11 and 12 are diagrams of architectures of a wireless communication system, according to an embodiment of the present disclosure.

The wireless communication may be implemented in various fashions. For example, the IWK-Layer may be implemented in a P-GW as well as an S-GW. Also, the 4G and 5G communication networks may share an MME or an HSS.

As a first example, the wireless communication system may be configured with an IWK-Layer implemented in an S-GW, a 4G communication network including 4G-specific MME and HHS, and a 5G communication network including 5G-specific MME and HSS.

As a second example, the wireless communication system may be configured with an IWK-Layer implemented in an S-GW, a 4G communication network including a 4G-specific MME, a 5G communication network including a 5G-specific MME, and a common HSS shared by the 4G and 5G communication networks.

As a third example, the wireless communication system may be configured with an IWK-Layer implemented in a P-GW, a 4G communication network including 4G-specific MME and HSS and a 5G control plane (cp), and a 5G communication network including 5G-specific MME and HSS and a 5G cp.

As a fourth example, the wireless communication system may be configured with an IWK-Layer implemented in a P-GW, a 4G communication network including a 4G-specific MME and a 5G control plane (cp), a 5G communication network including a 5G-specific MME and a 5G cp, and an HSS shared by the 4G and 5G communication networks.

The wireless communication system described above with reference to FIG. 3 corresponds to the first wireless communication system configured with an IWK-Layer implemented in an S-GW, a 4G communication network including 4G-specific MME and HHS, and a 5G communication network including 5G-specific MME and HSS.

The wireless communication system described above with reference to FIG. 11 corresponds to the second wireless communication system configured with an IWK-Layer implemented in an S-GW, a 4G communication network including a 4G-specific MME, a 5G communication network including a 5G-specific MME, and a common HSS shared by the 4G and 5G communication networks.

In the wireless communication system of FIG. 11, the authentication procedure between a UE and a communication network is performed only for initial attachment and skipped or simplified for extra attachment because the 4G and 5G communication networks share the same HSS 1101. Also, the authentication process between the UE and the MME at step 819 and the authentication process between the MME and HSS at step 817 in FIG. 8A may be skipped or simplified.

Additionally, because the UE has to maintain the connections to both the 4G and 5G communication networks, it may be necessary to upgrade the HSS 1101. Although the interface between the HSS 1101 and each of the 4G and 5G MMEs 1103 and 1105 is expressed as S6a+, which is different from the interface S6a between an HAA and an MME in FIG. 5, the present disclosure is not so limited.

The wireless communication system described above with reference to FIG. 12 corresponds to the fourth wireless communication system configured with an IWK-Layer implemented in a P-GW, a 4G communication network including a 4G-specific MME and a 5G control plane, a 5G communication network including a 5G-specific MME and a 5G control plane, and an HSS shared by the 4G and 5G communication networks.

In the third and fourth wireless communication systems characterized by the IWK-Layer implemented in the P-GW, it may prove advantageous to establish the 4G and 5G links through a GW-U that serves as the P-GW to which both the 4G and 5G communication networks are connected.

Accordingly, the HSS 1201 may bind the 4G and 5G links for one UE to select the same P-GW as a GW-U as shown in the fourth wireless communication system of FIG. 12. The same P-GW is selected as a GW-U for the 4G and 5G links for data transmission. That is, the P-GW may act as a common anchor for binding the 4G and 5G bearers.

Figure 13:
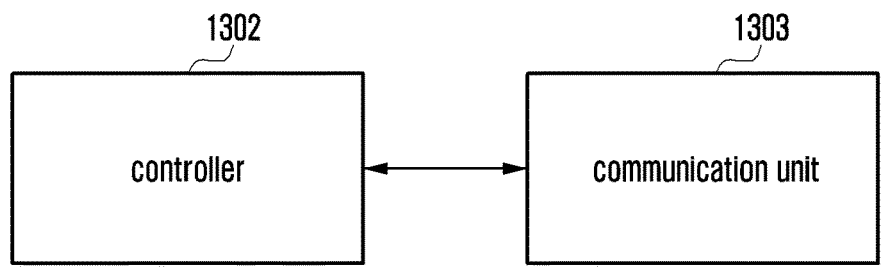
FIG. 13 is a diagram of components of a wireless communication system, according to an embodiment of the present disclosure.
Figure 13:
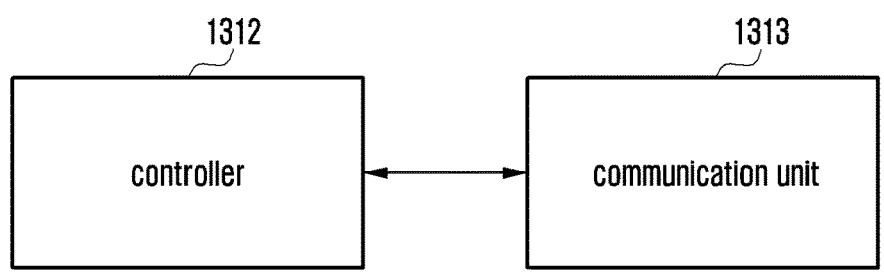
Figure 13:
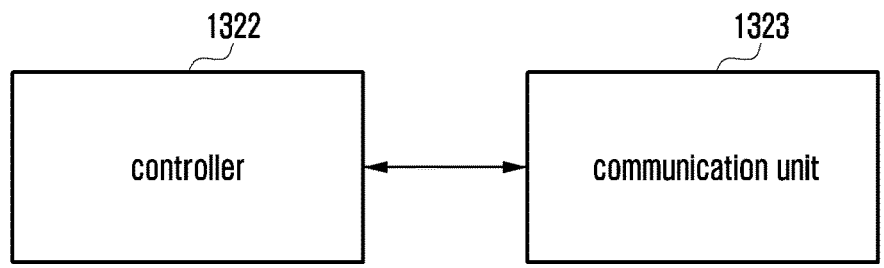

FIG. 13 is a diagram of components of a wireless communication system, according to an embodiment of the present disclosure.

FIG. 13, at (a), shows a configuration of a gateway of the present disclosure, FIG. 13, at (b), shows a configuration of an MME of the present disclosure, and FIG. 13, at (c) shows a configuration of a UE of the present disclosure.

In (a) of FIG. 13, the gateway 1301 includes a controller 1302 and a communication unit 1303.

The communication unit 1303 may communicate with a first MME via a first base station operating a first communication network and a second MME via a second base station operating a second communication network. The first and second communication networks may be 4G and 5G communication networks respectively or vice versa.

The controller 1302 controls the overall operations of the gateway 1301. For example, the controller 1302 controls the communication unit 1303 to receive signals. The controller 1302 may also write and read data to and from a storage unit. The controller 1302 may include one or more processors or be a part of a processor. When the controller 1302 includes multiple processors, one of the processors may be configured as a GW-C processor and another may be configured as a GW-U processor.

When a UE is connected to the first communication network, the controller 1302 may control the communication unit 1303 to receive a Create Session Request message transmitted by a second MME. The controller 1302 may allocate a second attach information for establishing a bearer between the gateway 1301 and a second base station based on the first attach information generated previously for connection to the first communication network. The first and second attach information may include at least one of an IP address generated for connection to the first communication network, an EPS bearer ID, and an uplink S1 tunnel ID. The controller 1302 may control the communication unit 1303 to transmit a Create Session Response message including the second attach information to the second MME in response to the Create Session Request message.

If the second base station detects RLF after the UE has connected to the second communication network, the controller 1302 may control the communication unit 1303 to receive the data buffered in the second base station, the buffered data being forwarded by the second base station. The controller 1302 may control the communication unit 1303 to forward the data received from the second base station to the first base station operating the first communication network.

In (b) of FIG. 13, the MME 1311 includes a controller 1312 and a communication unit 1313.

The communication unit 1313 communicates with a gateway of a wireless communication system that belongs to a first communication network and a second communication network. The first and second communication networks may be 4G and 5G communication networks respectively or vice versa.

The controller 1312 controls the overall operations of the MME 1311. For example, the controller 1312 may control the communication unit 1313 to receive signals. The controller 1312 may also write and read data to and from a storage unit. The controller 1312 may include one or more processors or be a part of a processor.

When a UE is connected to the first communication network, the controller 1312 may control the communication unit 1313 to transmit a Create Session Request message to the gateway. The controller 1312 may control the communication unit 1313 to receive a Create Session Response message including second attach information allocated based on a first attach information generated for connection to the first communication network from the gateway in response to the Create Session Request message. The second attach information may be generated for establishing a bearer between the gateway and a second base station operating a second communication network. The first and second attach information may include at least one of an IP address generated for connection to the first communication network, an EPS bearer ID, and an uplink S1 tunnel ID.

The controller 1312 may control the communication unit 1313 to transmit a context configuration request message including an uplink S1 tunnel ID to the second base station. The controller 1312 may control the communication unit 1313 to receive a context configuration response message including a downlink S1 tunnel ID.

In (c) of FIG. 13, the UE 1321 may include a controller 1322 and a communication unit 1323.

The communication unit 1323 communicates with a first base station operating a first communication network and a second base station operating a second communication network. The first and second communication networks may be 4G and 5G communication networks respectively or vice versa.

The controller 1322 controls the overall operations of the UE 1321. For example, the controller 1322 may control the communication unit 1323 to receive signals. The controller 1322 may also write and read data to and from a storage unit. The controller 1322 may include one or more processors or be a part of a processor.

When the UE is connected to the first communication network via the first base station, the controller 1322 may control the communication unit 1323 to transmit an attach request message for attachment to the second communication network. The controller 1322 may control the communication unit 1323 to receive an attach accept message including second attach information allocated based on the first attach information generated for connection to the first communication network in response to the attach request message. The first and second attach information may include at least one of an IP address generated for connection to the first communication network, an EPS bearer ID, and an uplink S1 tunnel ID.

In (a) to (c) of FIG. 13, the communication units 1303, 1313, and 1323 may perform a function for receiving signals through a radio channel. The communication units 1303, 1313, and 1323 may include a transceiver for transmitting and receiving signals. The communication units 1303, 1313, and 1323 may include multiple transceivers. The communication units 1303, 1313, and 1323 may perform radio frequency (RF) signal reception, frequency conversion, demodulation, decoding, cyclic prefix (CP) removal, fast Fourier transform (FFT), channel estimation, and equalization.

Figure 14:
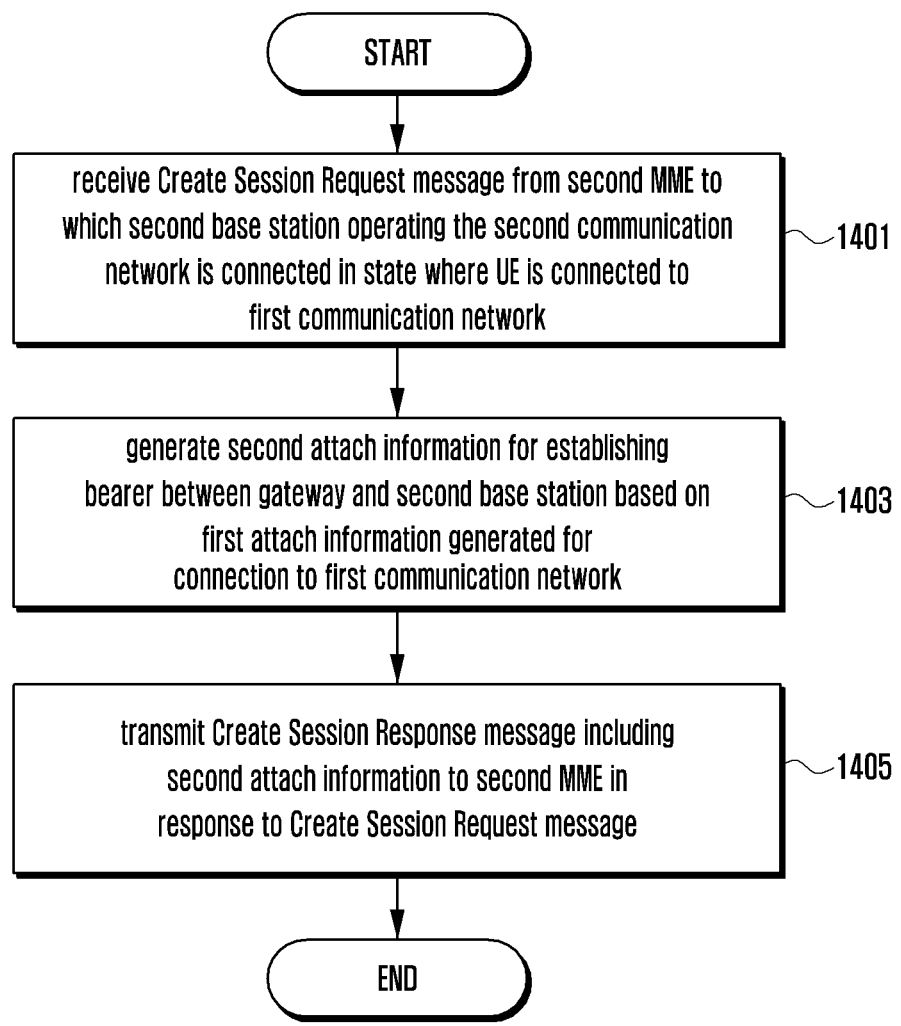
FIG. 14 is a flowchart of a network assignment method of a gateway, according to an embodiment of the present disclosure.

FIG. 14 is a flowchart of a network assignment method of a gateway, according to an embodiment of the present disclosure.

In FIG. 14, the gateway may be a gateway to which a first communication network and a second communication network are connected in a wireless communication system. The first and second communication networks may be 4G and 5G communication networks respectively or vice versa.

When a UE is connected to the first communication network, the gateway may receive a Create Session Request message at step 1401 from a second MME to which a second base station operating the second communication network is connected.

At step 1403, the gateway may allocate second attach information for establishing a bearer between the gateway and the second base station based on first attach information generated for connection to the first communication network. The first and second attach information may include at least one of an IP address generated for connection to the first communication network, an EPS bearer ID, and an uplink S1 tunnel ID.

At step 1405, the gateway may transmit a Create Session Response message including the second attach information to the second MME in response to the Create Session Request message.

If the second base station detects RLF after the UE has connected to the second communication network, the gateway may receive the data buffered in the second base station, the buffered data being forwarded by the second base station. The data received from the second base station may be forwarded to the first base station operating the first communication network.

The gateway may be a GW-C and GW-U.

The GW-C may receive a Create Session Request message from the second MME. The GW-C may transmit a Create Link Request message to the GW-U. The GW-U may generate the second attach information for establishing a bearer between the gateway and the second base station based on the first attach information generated for connection to the first communication network. The GW-U may also transmit a Create Link Response message including the second attach information to the GW-C in response to the Create Link Request message. The GW-C may transmit a Create Session Response message including the second attach information to the second MME in response to the Create Session Request message.

Figure 15:
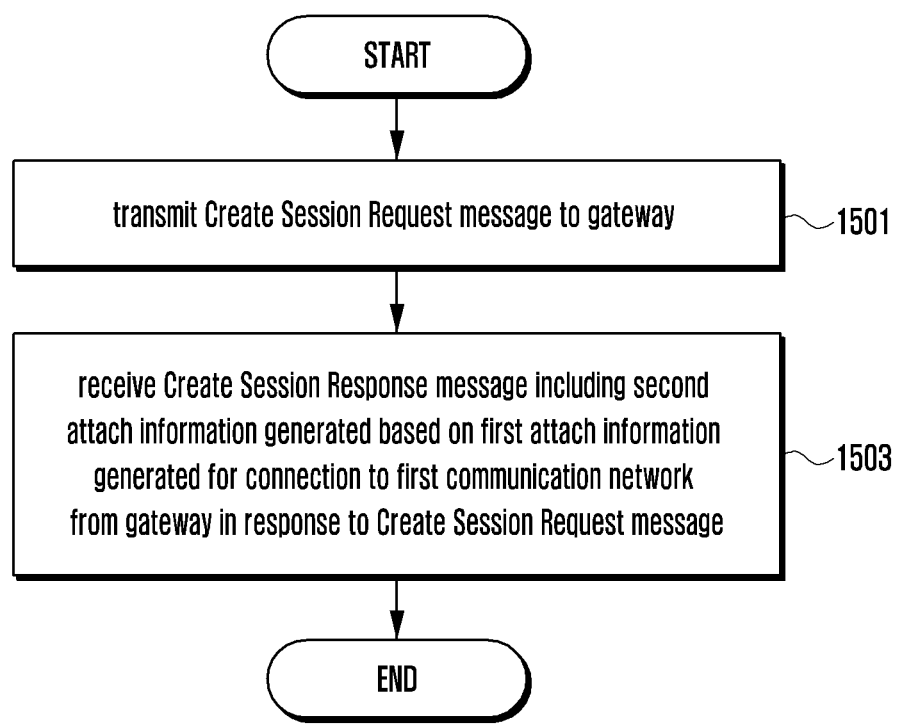
FIG. 15 is a flowchart of a network assignment method of an MME, according to an embodiment of the present disclosure.

FIG. 15 is a flowchart of a network assignment method of an MME, according to an embodiment of the present disclosure.

In FIG. 15, the MME may be an MME to which a first communication network or a second communication network is connected in a wireless communication system. The first and second communication networks may be 4G and 5G communication networks respectively or vice versa.

When a UE is connected to the first communication network, the MME may transmit a Create Session Request message to a gateway at step 1501.

The MME may receive, at step 1503, a Create Session Response message including the second attach information allocated based on a first attach information generated for connection to the first communication network from the gateway in response to the Create Session Request message. The second attach information may be generated for establishing a bearer between the gateway and a second base station operating a second communication network. The first and second attach information may include at least one of an IP address generated for connection to the first communication network, an EPS bearer ID, and an uplink S1 tunnel ID.

The MME may transmit a context configuration request message including an uplink S1 tunnel ID to the second base station. The MME may receive a context configuration response message including a downlink S1 tunnel ID from the second base station.

Figure 16:
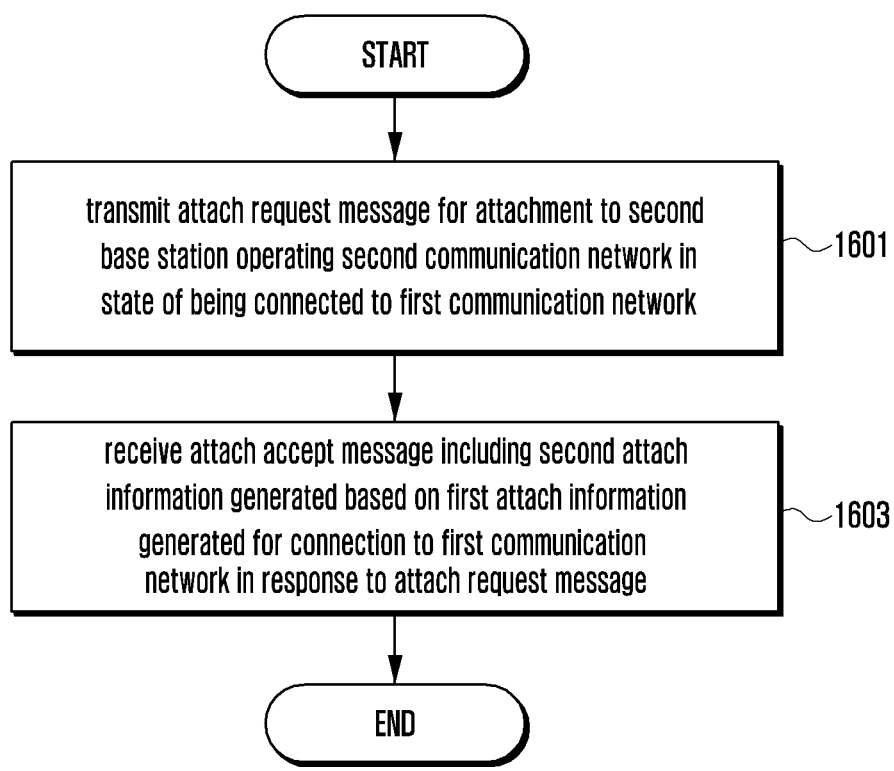
FIG. 16 is a flowchart of a network attachment method of a UE, according to an embodiment of the present disclosure.

FIG. 16 is a flowchart of a network attachment method of a UE, according to an embodiment of the present disclosure.

In FIG. 16, the UE may be a terminal capable of connecting to a wireless communication system via a first communication network and a second communication network. The first and second communication networks may be 4G and 5G communication networks respectively or vice versa.

When the UE is connected to the first communication network, the UE may transmit an attach request message at step 1601 for attachment to a second base station operating the second communication network.

The UE may receive, at step 1603, an attach accept message including second attach information allocated based on the first attach information generated for connection to the first communication network in response to the attach request message. The second attach information may be generated for establishing a bearer between the second base station and the gateway. The first and second attach information may include at least one of an IP address generated for connection to the first communication network, an EPS bearer ID, and an uplink S1 tunnel ID.

At least part of the components (e.g., modules or functions thereof) of a wireless communication system and methods (e.g., operations) of the present disclosure may be implemented in the form of a program module of instructions stored in a non-transitory computer-readable medium. A processor may execute an instruction to perform a corresponding function.

The program may be written and read to and from a non-transitory computer-readable storage medium to implement the methods described herein.

Examples of the non-transitory medium may include volatile and non-volatile memories capable of data storing temporarily for calculation or transmission such as a register, a cache, and a buffer as well as machine-readable media capable of storing data semi-persistently; whereas, temporary transmission media such as signals and current are not included in the examples of non-transitory storage medium.

The aforementioned programs may be stored in a non-transitory computer-readable storage media such as a compact disc (CD), a digital video disc (DVD), a blue-ray disc, a hard disk, a universal serial bus (USB) memory, an internal memory of the device of the present invention, a memory card, a read only memory (ROM), and a random access memory (RAM).

Also, the aforementioned programs may be stored in a memory of a server and transmitted to a terminal (e.g., one or more devices described herein) connected to the server through a network for sale or transferred to or registered with the server by a provider of the programs (e.g., program developer and program manufacturer).

When transferring the programs from the server to a terminal for sale, at least part of the programs may be buffered temporarily in a buffer of the server for transmission. The buffer of the server can be the non-transitory storage medium of the present invention.

A non-transitory computer-readable storage medium may store a program allowing a gateway, when a terminal is connected to a first communication network, to receive a Create Session Request message from a second MME to which a second base station operating a second communication network is connected, allocate a second attach information for establishing a bearer between a gateway and the second base station based on first attach information generated for connection to the first communication network, and transmit a Create Session Response message including the second attach information from a gateway to the second MME in response to the Create Session Request message.

A non-transitory computer-readable storage medium may store a program allowing a second MME, when a terminal is connected to a first communication network, to transmit a Create Session Request message to a gateway and receive a Create Session Response message including second attach information allocated based on first attach information generated for connection to the first communication network from the gateway. The second attach information may be generated for establishing a bearer between the gateway and the second base station operating the second communication network.

A non-transitory computer-readable storage medium may store a program allowing a terminal connected to a first communication network to transmit an Attach Request message for connection with a second communication network to a second base station operating the second communication network and receive an Attach Accept message including second attach information allocated based on first attach information generated for connection to the first communication network from the second base station. The second attach information may be generated for establishing a bearer between the second base station and the gateway.

The methods and apparatuses described herein overcome the shortcoming of conventional wireless communication systems, as they provide interoperability between 4G and 5G communication networks without dependency on a specific RAT. That is, the methods and apparatuses provide a 5G communication service without dependency on an operation procedure associated with the 4G communication service, thereby resulting in a standalone 5G communication service area.

Also, the methods and apparatuses can reduce total operating costs of the communication systems, such as operating expenditure and capital expenditure, by reusing legacy 4G RAN and evolved packet core (EPC) for 5G communication service interoperability, thereby obviating the need to upgrade 4G base stations for interoperability, and obviating the need to perform a forward compatibility test between 4G and 5G communication networks, which requires processing overhead. That is, the 4G and 5G communication networks can be managed independently and upgraded separately.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. A network assignment method of a gateway in a wireless communication system including a first communication network and a second communication network, the method comprising:
receiving, when a terminal is connected to the first communication network, a create session request message from a second mobility management entity associated with a second base station operating the second communication network;
allocating second attach information for establishing a bearer between the gateway and the second base station based, on first attach information generated for connection to the first communication network; and
transmitting to the second mobility management entity, a create session response message including the second attach information, in response to the create session request message.

2. The method of claim 1, wherein the first communication network and the second communication network are a $4^{th}$ generation (4G) communication network and a $5^{th}$ generation (5G) communication network respectively.

3. The method of claim 1, wherein the first attach information and the second attach information include at least one of an internet protocol (IP) address generated for connection to the first communication network, an evolved packet system (EPS) bearer identifier (ID), and an uplink S1 tunnel ID.

4. The method of claim 1, further comprising:
receiving, when the second base station detects radio link failure after the terminal connects to the second communication network, data buffered in the second base station; and
forwarding the data received from the second base station to a first base station operating the first communication network.

5. The method of claim 1, wherein:
receiving the create session request message comprises receiving, at a control gateway of the gateway, the create session request message from the second mobility management entity;
generating the second attach information comprises transmitting the create link request message from the control gateway to a user gateway of the gateway, which comprises the control and user gateways, generating, at the user gateway, the second attach information, transmitting, at the user gateway, a create link response message including the second attach information to the control gateway in response to the create link request message; and
transmitting the create session response message to the second mobility management entity comprises transmitting the create session response message including the second attach information from the control gateway to the second mobility management entity in response to the create session request message.

6. A network assignment method of a mobility management entity in a wireless communication system including a first communication network and a second communication network, the method comprising:
transmitting, when a terminal is connected to the first communication network, a create session request message to a gateway; and
receiving a create session response message including second attach information allocated based on first attach information generated for connection to the first communication network, from the gateway, in response to the create session request message,
wherein the second attach information is generated for establishing a bearer between the gateway and a second base station operating the second communication network.

7. The method of claim 6, wherein the first communication network and the second communication network are a $4^{th}$ generation (4G) communication network and a $5^{th}$ generation (5G) communication network respectively.

8. The method of claim 6, wherein the first attach information and the second attach information include at least one of an internet protocol (IP) address generated for connection to the first communication network, an evolved packet system (EPS) bearer identifier (ID), and an uplink S1 tunnel ID.

9. The method of claim 6, further comprising:
transmitting a context setup request message including an uplink S1 tunnel identifier (ID) as the second attach information to the second base station; and
receiving a context setup response message including a downlink S1 tunnel ID from the second base station in response to the context setup request message.

10. A network connection method of a terminal in a wireless communication system including a first communication network and a second communication network, the method comprising:
- transmitting, when the terminal is connected to the first communication network, an attach request message for connection to the second communication network to a second base station operating the second communication network; and
- receiving an attach accept message including second attach information allocated based on first attach information generated for connection to the first communication network, in response to the attach request message,
- wherein the second attach information is generated for establishing a bearer between the second base station and a gateway.

11. The method of claim 10, wherein the first communication network and the second communication network are a 4$^{th}$ generation (4G) communication network and a 5$^{th}$ generation (5G) communication network respectively.

12. The method of claim 10, wherein the first attach information and the second attach information include at least one of an internet protocol (IP) address generated for connection to the first communication network, an evolved packet system (EPS) bearer identifier (ID), and an uplink S1 tunnel ID.

13. A gateway for assigning a network in a wireless communication system including a first communication network and a second communication network, the gateway comprising:
- a transceiver configured to communicate with a first mobility management entity associated with a first base station operating the first communication network and a second mobility management entity associated with a second base station operating the second communication network; and
- a controller coupled with the transceiver and configured to:
- control, when a terminal is connected to the first communication network, the transceiver to receive a create session request message from the second mobility management entity,
- allocate second attach information for establishing a bearer between the gateway and the second base station based on first attach information generated for connection to the first communication network, and
- control the transceiver to transmit to the second mobility management entity, a create session response message including the second attach information, in response to the create session request message.

14. The gateway of claim 13, wherein the first communication network and the second communication network are a 4$^{th}$ generation (4G) communication network and a 5$^{th}$ generation (5G) communication network respectively.

15. The gateway of claim 13, wherein the first attach information and the second attach information include at least one of an internet protocol (IP) address generated for connection to the first communication network, an evolved packet system (EPS) bearer identifier (ID), and an uplink S1 tunnel ID.

16. The gateway of claim 13, wherein the controller is further configured to control, when the second base station detects radio link failure after the terminal connects to the second communication network, the transceiver to receive data buffered in the second base station and forward the data received from the second base station to a first base station operating the first communication network.

17. A mobility management entity for assigning a network in a wireless communication system including a first communication network and a second communication network, the second mobility management entity comprising:
- a transceiver configured to communicate with a gateway of the wireless communication system; and
- a controller coupled with the transceiver and configured to:
- control, when a terminal is connected to the first communication network, the transceiver to transmit a create session request message to the gateway and
- control the transceiver to receive a create session response message including second attach information allocated based on first attach information generated for connection to the first communication network, in response to the create session request message,
- wherein the second attach information is generated for establishing a bearer between the gateway and a second base station operating the second communication network.

18. The mobility management entity of claim 17, wherein the first communication network and the second communication network are a 4$^{th}$ generation (4G) communication network and a 5$^{th}$ generation (5G) communication network respectively,
- wherein the first attach information and the second attach information include at least one of an internet protocol (IP) address generated for connection to the first communication network, an evolved packet system (EPS) bearer identifier (ID), and an uplink S1 tunnel ID,
- wherein the controller is further configured to:
- control the transceiver to transmit a context setup request message including an uplink S1 tunnel ID as the second attach information to the second base station and
- control the transceiver to receive a context setup response message including a downlink S1 tunnel ID from the second base station in response to the context setup request message.

19. A terminal for connecting to a network in a wireless communication system including a first communication network and a second communication network, the terminal comprising:
- a transceiver configured to communicate with a first base station operating the first communication network and a second base station operating the second communication network; and
- a controller coupled with the transceiver and configured to:
- control the transceiver to transmit, when the terminal is connected to the first communication network through the first base station, an attach request message for connection to the second communication network to the second base station operating the second communication network, and
- control the transceiver to receive from the second base station an attach accept message including second attach information generated based on first attach information generated for connection to the first communication network in response to the attach request message,
- wherein the second attach information is generated for establishing a bearer between the second base station and a gateway.

20. The terminal of claim 19, wherein the first communication network and second communication network are a $4^{th}$ generation (4G) communication network and a $5^{th}$ generation (5G) communication network respectively,
   wherein the first attach information and the second attach information include at least one of an internet protocol (IP) address generated for connection to the first communication network, an evolved packet system (EPS) bearer identifier (ID), and an uplink S1 tunnel ID.

* * * * *